US008411308B2

(12) United States Patent
Hara et al.

(10) Patent No.: US 8,411,308 B2
(45) Date of Patent: Apr. 2, 2013

(54) PRINTING MACHINE AND EJECTION CONTROL METHOD FOR THE SAME

(75) Inventors: Masashi Hara, Ibaraki-ken (JP); Masahiro Nishihata, Ibaraki-ken (JP); Hitoshi Arai, Ibaraki-ken (JP); Takashi Hasegawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 386 days.

(21) Appl. No.: 12/863,827

(22) PCT Filed: Mar. 11, 2009

(86) PCT No.: PCT/JP2009/054700

§ 371 (c)(1), (2), (4) Date: Jul. 21, 2010

(87) PCT Pub. No.: WO2009/113597

PCT Pub. Date: Sep. 17, 2009

(65) Prior Publication Data

US 2010/0290064 A1 Nov. 18, 2010

(30) Foreign Application Priority Data

Mar. 13, 2008 (JP) ................................ P2008-064619

(51) Int. Cl.
*G06F 15/00* (2006.01)

(52) U.S. Cl. ........................................................ 358/1.15

(58) Field of Classification Search .................. 358/1.15
See application file for complete search history.

(56) References Cited

U.S. PATENT DOCUMENTS 6,374,076 B1 * 4/2002 Tanaka .......................... 399/396

FOREIGN PATENT DOCUMENTS

JP 01-150293 6/1989
JP 06-119770 4/1994

(Continued)

OTHER PUBLICATIONS

Form PCT/IB/338 (Notification of Transmittal of Translation of the International Preliminary Report on Patentability (Chapter I or Chapter II of the Patent Cooperation Treaty)) for International Application No. PCT/JP2009/054700, with a mailing date of Nov. 11, 2010, one (1) page.

(Continued)

*Primary Examiner* — Saeid Ebrahimi Dehkordy
(74) *Attorney, Agent, or Firm* — Nath, Goldberg & Meyer; Jerald L. Meyer; Scott C. Langford

(57) ABSTRACT

Disclosed is a printing machine comprising: encoders (311 and 312) configured to detect respective angular velocities of a drive roller and a driven roller as a travel speed of core members inside a transfer belt (160); a DSP (321) configured to extract from a temporal variation in a ratio of the measured speed at each roller speed ratio data (profile data) having a frequency corresponding to the speed ratio of a core portion; profile data memory (332) configured to store the profile data; and a head controller (334) configured to control the timing at which each image is formed by a head unit (110) on the basis of the profile data so that positional deviation among multiple images on the transfer belt (160) may be reduced. The head unit (110) forms multiple images on a record medium under the control of the head controller (334). Thus, an ink misalignment at the time of printing can be prevented with high accuracy by recording a change in the core members inside the belt as a profile, using this profile, and reducing memory usage and arithmetic processing load.

16 Claims, 27 Drawing Sheets

FOREIGN PATENT DOCUMENTS

| | | | |
|---|---|---|---|
| JP | 9-62047 | A | 3/1997 |
| JP | 10-333774 | | 12/1998 |
| JP | 2001-223485 | A | 8/2001 |
| JP | 2001-351370 | A | 12/2001 |
| JP | 2004-185699 | A | 7/2004 |
| JP | 2005-219339 | A | 8/2005 |
| JP | 2006-227192 | A | 8/2006 |
| JP | 2006-243547 | A | 9/2006 |

OTHER PUBLICATIONS

English translation of the International Preliminary Report on Patentability (Chapter I of the Patent Cooperation Treaty), issued Nov. 2, 2010, for International Application No. PCT/JP2009/054700, four (4) pages.

Official Action issued on Feb. 7, 2012 in the counterpart Japanese application, one (1) page.

* cited by examiner (a)

(b)

(a)

(b)

(a)

(b)

(a)

(b)

(a)

(b)

(a)

(b)

(a)

(b)

PRINTING MACHINE AND EJECTION CONTROL METHOD FOR THE SAME

This is a National Phase Application filed under 35 U.S.C. 371 as a national stage of PCT/JP2009/054700, filed Mar. 11, 2009, an application claiming foreign priority benefits under 35 USC 119 of Japanese Application No. P2008-064619, filed on Mar. 13, 2008, the entire content of each of which is hereby incorporated by reference.

TECHNICAL FIELD

The present invention relates to a printing machine. In particular, the present invention relates to a printing machine in which an endless transfer belt transfers paper sheets and multiple images are formed on a record sheet on the transfer belt, and relates to an ejection control method for the same.

BACKGROUND ART

Heretofore, there has been a printing machine including a transfer mechanism for transferring record sheets using an endless transfer belt. In this printing machine, record sheets are transferred using the transfer belt and are sequentially moved to pass through multiple ink heads which are arranged in the direction of transfer thereof and configured to form images of different single colors, respectively. This enables a color image to be obtained by superimposing images of the respective single colors on a record sheet.

Meanwhile, highly-accurate drive control for moving the transfer belt at a constant travel speed is required. For this reason, as a mechanism for keeping a constant rotational speed of a drive roller configured to drive the belt, there have heretofore been known drive control methods for controlling the rotation of the drive roller. Such drive control methods include one by which the rotational speed of the drive roller is kept constant by keeping constant the angular speed of a motor, which serves as a drive source, and the angular speed of a gear, which is configured to transmit the rotational driving force generated by the motor to the drive roller.

However, a variance in the belt thickness in the circumferential direction of the belt exists; therefore, there is the problem that the travel speed of the belt changes due to this variance. This belt thickness variance is caused by a deviation in wall thickness in the circumferential direction of the belt, and is observed in a belt fabricated by, for example, centrifugal sintering using a cylinder mold. In the case where such a belt thickness variance exists in the belt, the belt travel speed is high when a portion of the belt which has a large thickness is placed around a drive roller which is configured to drive the belt, and, on the other hand, the belt travel speed is low when a portion of the belt which has a small thickness is placed around the drive roller. Thus, a variation occurs in the belt travel speed.

In the case where the travel speed of the transfer belt is not kept constant as described above, when single-color images are to be formed on a record sheet respectively using multiple ink heads, and these images of multiple colors are to be superimposed on each other, so-called “ink misalignment” occurs in which the respective transfer positions of the single-color images are misaligned relative to each other. If such an ink misalignment occurs, a thin line image formed by superimposing images of multiple colors on each other may look blurred, and a white spot may appear around the outline of a black character image formed in a background image which is formed by superimposing images of the multiple colors, for example.

As a technique for a reducing belt speed variation to prevent such an ink misalignment, for example, there is a technique described in Patent Document 1. In this technique disclosed in Patent Document 1, a thickness profile (belt thickness variance) over the entire loop of the belt is measured in advance, and data on the thickness profile is stored in data storage. Then, the phase of the thickness profile data for the entire loop and that of actual belt thickness variance are matched to each other, and print timings are changed so that print positional deviation due to the belt speed variation may not occur.

Specifically, in this technique disclosed in Patent Document 1, from data on the difference between the angular velocities of two rollers (a drive roller and a driven roller) over which a transfer belt is passed, an alternating current component of the angular speed which has a frequency corresponding to a belt speed variation is extracted. From data on the amplitude and phase of the alternating current component thus extracted, a belt speed variation due to the belt thickness variance is recognized. Based on the belt speed variation thus recognized, the timing for the initiation of image formation and the speed of image formation during the image formation are adjusted for each of the multiple images.

Patent Document 1: Japanese Unexamined Patent Application Publication No. 2006-227192

DISCLOSURE OF THE INVENTION

Problems to be Solved by the Invention

However, in the technique disclosed in Patent Document 1, since the travel speed of the belt immediately below each ink head is calculated based on the difference between the angular speed of the drive roller and the angular speed of the driven roller, the amount of arithmetic processing for calculating the travel speed of the belt immediately below each ink head is large. Accordingly, there have been problems that memory usage required for the arithmetic processing increases and that an accurate ink misalignment correction cannot be performed due to operational delay.

Specifically, in the conventional case where an ink misalignment is corrected based on the difference between the respective speeds of the drive roller and the driven roller, when the speed changes, an error ratio in detection processing and arithmetic processing results in undergoing changes. Accordingly, a profile is needed for each of all speeds, and arithmetic processing need to be performed again every time the speed changes. Thus, as described above, memory usage increases, and operational delay occurs.

The present invention has been made in view of the above-described problems, and an object of the present invention is to provide a printing machine including a transfer mechanism for transferring a sheet using a transfer belt and to provide an ejection control method for the same. In the printing machine, an ink misalignment at the time of printing can be prevented with high accuracy by: recording a change of the speed of the transfer belt as a profile; using the profile; and reducing memory usage and arithmetic processing load.

Means for Solving the Problems (Profile Based on Speed Ratio)

To solve the above-mentioned problem, the present invention is a printing machine including a transfer belt of an endless form applied over support rollers, driving means for rotating the support rollers to move the transfer belt in an endless manner, and ink heads for forming images to overlap on a record sheet on the transfer belt, characterized by: speed measuring means for measuring travel speeds at a pair of measurement points set on a combination of the transfer belt and the support rollers; an extractor for working with a temporal variation in ratios of speeds between the measurement points measured by the speed measuring means to extract a set of speed ratio data having frequencies corresponding to the ratios of the speeds; a storage for storing the set of speed ratio data as extracted; print control means for working with the set of speed ratio data stored in the storage to control timings of formation of images by the ink heads for reduction in positional deviation among the images on the transfer belt; and the ink heads for working with the print control means to form images on a record medium.

Another invention is A method for controlling ejection of ink heads in a printing machine, the printing machine including: a transfer belt of an endless form applied over support rollers; driving means for rotating the support rollers to move the transfer belt in an endless manner; and ink heads for forming images to overlap on a record medium on the transfer belt, the method being characterized by: (1) a speed measuring step of measuring travel speeds at a pair of measurement points set on a combination of the transfer belt and the support rollers; (2) a speed extracting step of working with a temporal variation in the travel speeds at the respective measurement points measured in the speed measuring step to extract a set of speed ratio data having frequencies corresponding to the ratios of speeds; and (3) a print control step of, upon performance of print processing, measuring a travel speed at any one of the pair of the measurement points, correcting a result of the measurement on a basis of the set of speed ratio data, and controlling timings of formation of images by the ink heads for reduction in positional deviation among the images on the transfer belt.

In these inventions, ratios of the respective speeds at two arbitrary measurement points set on a combination of the transfer belt and its support roller are detected to be used as a set of speed ratio data (so-called profile) on the belt. This makes it possible to reliably eliminate an ink misalignment. In other words, employing as a parameter ratio of the speeds at two measurement points in the generation of a profile enables an error ratio to be kept within a certain range and enables any speed to be covered by a single profile. As a result, even in a printing machine in which the travel speed of the belt varies in accordance with the resolution and the print mode, the present invention makes it possible to reduce the size of the profile data, to calculate the travel speed of a core member immediately below each ink head in an abbreviated manner, and thereby to avoid an increase in memory capacity and a delay in processing.

(Profile Based on Ratio of Speeds of First Roller and Second Roller)

It is preferable in the invention of the printing machine that the speed measuring means is a core member speed measuring means for measuring travel speeds at a pair of measurement points of a core portion formed by core members connected in a continuous loop form in a circumferential direction of the transfer belt inside the transfer belt, and the extractor works with a temporal variation in ratios of speeds between the measurement points measured by the core member speed measuring means to extract a set of ratio data having frequencies corresponding to the ratios of the speeds of the core portion.

Similarly, it is preferable in the method for controlling ejection in the printing machine that the speed measuring step (the above (1)) comprises measuring travel speeds at a pair of measurement points of a core portion formed by core members connected in a continuous loop form in a circumferential direction of the transfer belt inside the transfer belt, and the speed extracting step (the above (2)) comprises working with a temporal variation in ratios of speeds between the measurement points measured in the speed measuring step to extract a set of speed ratio data having frequencies corresponding to the ratios of the speeds of the core portion.

It is preferable in the invention that the pair of measurement points for measurement of travel speeds are positions of intersection points of the core portion with respective normal lines to a first roller and a second roller at respective contact points thereof with an inner circumferential surface of the transfer belt, the first roller and the second roller being respectively disposed at front and back ends of a surface of the transfer belt facing the ink heads, and the core member speed measuring means measures components in tangent directions at the contact points as travel speeds of the core member at the respective positions of the intersection points.

In the invention, the core member speed measuring means may include a detecting means for detecting angular speeds of the first roller and the second roller as travel speeds of the core member at the respective positions of the intersection points, and the extractor may work with a temporal variation in ratios of the angular speeds detected by the detecting means to extract the set of speed ratio data.

In the invention, the first roller may be a drive roller, and the second roller may be a driven roller for rotating in response to driving force of the drive roller transmitted through the transfer belt.

In these cases, ratios of the speeds at two points on the core portion inside the transfer belt are detected to be used as a profile. This makes it possible to take into consideration influences of events, such as the undulation of the core members inside the belt, which cannot be grasped from the surface of the belt, and to reliably eliminate an ink misalignment.

(Profile Based on Accumulation of Speed Ratio)

It is preferable in the invention of the printing machine that the extractor sets a point on the transfer belt as a reference point, sets a distance between the pair of the measurement points as a reference relative distance, sets a ratio of speeds between one measurement point of the pair of the measurement points and the other measurement point as a relative ratio of speeds, sets a speed at a time when the reference point is positioned at any one of the pair of the measurement points as a reference speed, and thereafter, sequentially accumulates the relative ratio of speeds between the pair of the measurement points on the reference speed starting from the reference point in a circumferential direction of the belt at intervals of the reference relative distance to calculate a ratio of speeds at each point to the reference point over an entire loop of the belt.

Similarly, it is preferable in the method for controlling ejection in the printing machine that the speed extraction step (the above (2)) comprises setting a point on the transfer belt as a reference point, setting a distance between the pair of the measurement points as a reference relative distance, setting a ratio of speeds between one measurement point of the pair of the measurement points and the other measurement point as a relative ratio of speeds, setting a speed at a time when the reference point is positioned at any one of the pair of the measurement points as a reference speed, and, thereafter, subsequently accumulating the relative ratio of speeds between the pair of the measurement points on the reference speed starting from the reference point in a circumferential direction of the belt at intervals of the reference relative distance to calculate a ratio of speeds at each point to the reference point over an entire loop of the belt.

In these cases, the speed ratios of two arbitrary measurement points are accumulated, starting from the reference point at intervals of the reference relative distance. Accordingly, the speed ratios with respect to the reference point can be obtained for the entire belt, and a series of behaviors associated with the rotation of the belt can be linearly handled in accordance with a certain criterion. Thus, elimination of an ink misalignment can be appropriately executed.

It should be noted that, in the above-described invention, it may be configured as follows: in a case where the two arbitrary measurement points are respectively set as a first measurement point and a second measurement point, the travel speed at the first measurement point is a travel speed of the surface of the transfer belt, and the second measurement point is a rotational speed of the support roller; the belt speed extractor and the roller speed extractor set a travel speed at the first measurement point at an arbitrary time as a reference speed, set as a relative speed ratio a speed ratio at the first measurement point after a predetermined time has elapsed, and sequentially accumulate the relative speed ratio on the reference speed in order to calculate the speed ratio of each point with respect to the reference speed over the entire loop of the belt.

In this case, cumulative data obtained by accumulating the variation in the speed ratios is used. Accordingly, the speed ratios with respect to the reference point can be obtained for the entire belt. Thus, the arithmetic processing can be simplified. To be more specific, in order to eliminate an ink misalignment, it is necessary to calculate an absolute positional deviation with respect to an appropriate landing position. However, measurement values at each moment respectively at two measurement points on the belt represent a relative speed variation between these two measurement points. Accordingly, at the time of correcting an ink misalignment, it is necessary to calculate an absolute speed variation with respect to a predetermined reference point. In the present invention, a relative speed variation is accumulated on a predetermined reference value to be changed into an absolute speed variation and profiled as cumulative data in advance; therefore, the arithmetic processing load during print execution can be reduced.

Furthermore, in the present invention, the variation in the speed ratios is accumulated to be handled as cumulative data. Thus, a speed ratio with respect to the reference point can be found for each point on the belt. This makes it possible to instantaneously grasp the maximum amount of deviation accumulated for the entire belt. Such a maximum amount cannot be estimated from data obtained by calculating the speed ratio at each moment at each point on the belt in real time. As a result, any product in which the maximum amount of the deviation exceeds a tolerance level can be easily and quickly identified in, for example, an inspection at the time of shipment from a factory.

(Re-Extraction of Profile)

It is preferable in the invention that there further provided a monitor for monitoring of a length of the transfer belt, and the extractor performs extraction of the set of speed data upon detection of a change in the length of the transfer belt. This makes it possible to obtain a profile again in the case where the transfer belt has expanded or contracted due to a change over time or a change in temperature. Accordingly, this makes it possible to reliably prevent an ink misalignment in accordance with a change of the transfer belt over time or a change in temperature.

It is preferable in the invention that there further provided a monitor for monitoring a change in an ambient temperature around the transfer belt, and the extractor performs extraction of the set of speed data upon detection of a change in the ambient temperature around the transfer belt. This makes it possible to obtain a profile again in such a case where the transfer belt expands or contracts due to a change in the ambient temperature. Accordingly, this makes it possible to reliably prevent an ink misalignment in accordance with a change in the ambient temperature around the transfer belt.

(Utilization of Belt Profile Data and Roller Profile Data)

In the invention of the printing machine, the extractor includes a belt speed extractor works with a temporal variation in travel speeds at the respective measurement points measured by the speed measuring means to extract a set of belt profile data having frequencies corresponding to a travel speed of the transfer belt; and a roller speed extractor works with the temporal variation in the travel speeds at the respective measurement points measured by the speed measuring means to extract a set of roller profile data having frequencies corresponding to a rotational speed of a support roller, the belt speed extractor and the roller speed extractor calculate a temporal variation in ratios of speeds between the measurement points as the temporal variation in the travel speeds at the respective measurement points, and works with frequencies corresponding to the ratios of the speeds as calculated to extract the set of belt profile data and the set of roller profile data, the storage stores the set of belt profile data and the set of roller profile data as extracted, upon performance of print processing, the print control means measures a travel speed at any one of the pair of the measurement points, corrects a result of the measurement on a basis of the set of belt profile data and the set of roller profile data, and controls timings of formation of images by the ink heads for reduction in positional deviation among the images on the transfer belt, and the ink heads works with the print control means to form images on a record medium.

Similarly, it is preferable in the method for controlling ejection in the printing machine that the speed extracting step (the above (2)) comprises working with a temporal variation in travel speeds at the respective measurement points measured in the speed measuring step (the above (1)) to extract a set of belt profile data having frequencies corresponding to a travel speed of the transfer belt, and working with the temporal variation in the travel speeds at the respective measurement points to extract a set of roller profile data having frequencies corresponding to a rotational speed of a support roller, and the print control step (the above (3)) comprises, upon performance of print processing, measuring a travel speed at any one of the pair of the measurement points, correcting a result of the measurement on a basis of the set of belt profile data and the set of roller profile data, and controlling timings of formation of images by the ink heads for reduction in positional deviation among the images on the transfer belt.

According to these inventions, the travel speed at two measurement points on the transfer belt is detected to be used as profiles of the transfer belt and the support roller configured to drive this transfer belt. Specifically, in the present invention, the speed variation due to the thickness variance over the entire loop of the transfer belt and the like and the speed variation due to the eccentricity of the support roller and the like are measured in advance, and are stored as belt profile data and roller profile data in a storage. Then, when actual print processing is performed, the travel speed at any one of these two measurement points is measured, and profile data is reflected in a result of the measurement. Further, the print timing is changed so that print positional deviation due to the variation in the transfer belt speed may not occur. This makes it possible to eliminate an ink misalignment.

In particular, in the present invention, the belt profile data and the roller profile data are stored and used as separate pieces of file data. Accordingly, for example, in such a case where only the transfer belt is to be changed, only the belt profile data can be newly created to be installed in the printing machine. This can be performed only by work and operation at the site where the printing machine is installed. Thus, the maintenance work can be facilitated.

To be more specific, the transfer belt and its support roller have a mechanical relationship, and errors due to the respective part characteristics and accuracies thereof mutually influence each other. As a result, the errors in one of them have a significant overall influence. Accordingly, in the case where a single profile is used for the transfer belt and the support roller, when only the transfer belt has been changed, for example, there arises the necessity of inspecting the mechanical relationship again between a new transfer belt which has been newly installed and the existing support roller, and then reflecting the mechanical relationship in the profile. Such a case cannot be dealt with only by work at the installation site of the printing machine. Thus, this results in an increase in the burden of the maintenance work.

It is preferable in the invention that the roller speed extractor works with the temporal variation in the travel speeds at the respective measurement points to extract the set of roller profile data on a basis of frequencies corresponding to a rotation period of the support roller, and the belt speed extractor calculates the frequencies corresponding to the rotation period of the support roller as an eccentricity component of the support roller, and removes the eccentricity component of the support roller from the frequencies corresponding to the travel speeds of the transfer belt to extract the set of belt profile data.

In this case, the roller profile data and the belt profile data can be obtained from one measurement result without an increase in the amount of measurement of the travel speed at measurement points. Thus, the burden of profile creation can be reduced.

It is preferable in the invention that upon the pair of the measurement points being a first measurement point and a second measurement point, a travel speed at the first measurement point is a travel speed of a surface of the transfer belt, and a travel speed at the second measurement point is a rotational speed of the support roller, and the speed measuring means for the first measurement point is a noncontact measuring device attachably and detachably provided to the printing machine and configured to optically measure the travel speed of the surface of the transfer belt.

In this case, when measurement is performed at the first measurement point at the time of profile creation, a device configured to optically measure a surface of the belt profile can be used as a measuring device for this measurement. This belt profile creation is performed at a low frequency, that is, for example, at the time such as the time of shipment from a factory. Accordingly, incorporating an expensive measuring device such as an optical sensor only for that purpose unnecessarily increases the fabrication cost. In the present invention, by attaching the above-described optical measuring device only at the time of belt profile creation and removing this measuring device after the profile creation, the fabrication cost can be reduced. It should be noted that examples of such an optical measuring device include a laser Doppler velocimeter, which is configured to measure the speed of an object by measuring a change in wavelength between an incident light and a reflected light on the basis of the relative speed with respect to the object, and the like.

It is preferable in the invention that upon the pair of the measurement points being a first measurement point and a second measurement point, a travel speed at the first measurement point is a travel speed of a surface of the transfer belt, and a travel speed at the second measurement point is a rotational speed of the support roller, and the extractor includes: a belt speed extractor for working with a temporal variation in travel speeds at the respective measurement points measured by the speed measuring means to extract a set of belt profile data having frequencies corresponding to a travel speed of the transfer belt; and a roller speed extractor for working with the temporal variation in the travel speeds at the respective measurement points measured by the speed measuring means to extract a set of roller profile data having frequencies corresponding to a rotational speed of the support roller.

In this case, the belt speed extractor and the roller speed extractor set a travel speed at the first measurement point at an arbitrary time as a reference speed for the temporal variation in the travel speeds at the respective measurement points, set a ratio of speeds at the first measurement point after elapse of a prescribed time as a relative speed ratio, sequentially accumulate the relative ratio of speeds on the reference speed to calculate a set of cumulative data on a ratio of speeds at each point to the reference speed over an entire loop of the belt, and work with frequencies corresponding to the set of cumulative data to extract the set of belt profile data and the set of roller profile data. And it is preferable that the storage stores the set of belt profile data and the set of roller profile data as extracted, upon performance of print processing, the print control means measures a travel speed at anyone of the pair of the measurement points, corrects a result of the measurement on a basis of the set of belt profile data and the set of roller profile data, and controls timings of formation of images by the ink heads for reduction in positional deviation among the images on the transfer belt, and the ink heads works with the print control means to form images on a record medium.

In this case, the speed ratio over time is accumulated on the reference speed at the reference point. Accordingly, the speed ratio with respect to the reference point can be acquired for the entire belt, and a series of behaviors associated with the rotation of the belt can be handled as an absolute speed variation on the basis of a certain reference speed. Thus, an ink misalignment elimination can be appropriately executed.

Effects of the Invention

According to the above-described invention, in a printing machine including a transfer mechanism for transferring a sheet using a transfer belt, an ink misalignment at the time of printing can be prevented with high accuracy by recording the variance of the core members inside the belt as a profile, using the profile, and reducing memory usage and arithmetic processing load.

Moreover, in the above-described invention, the speed variation of the transfer belt based on not only information on the variance in the belt thickness but also information on the eccentricity of the roller shaft are retained as profiles, and adjusted to be used as correction data at the time of print processing. Thus, the belt travel speed can be controlled with higher accuracy. Also, information on the transfer belt and information on the roller are handled as independent pieces of profile data from each other. Thus, the correction data for the belt travel speed at the time of maintenance can be easily replaced.

BEST MODES FOR CARRYING OUT THE INVENTION

[First Embodiment]

(Overall Configuration of Printing Machine)

Figure 1:
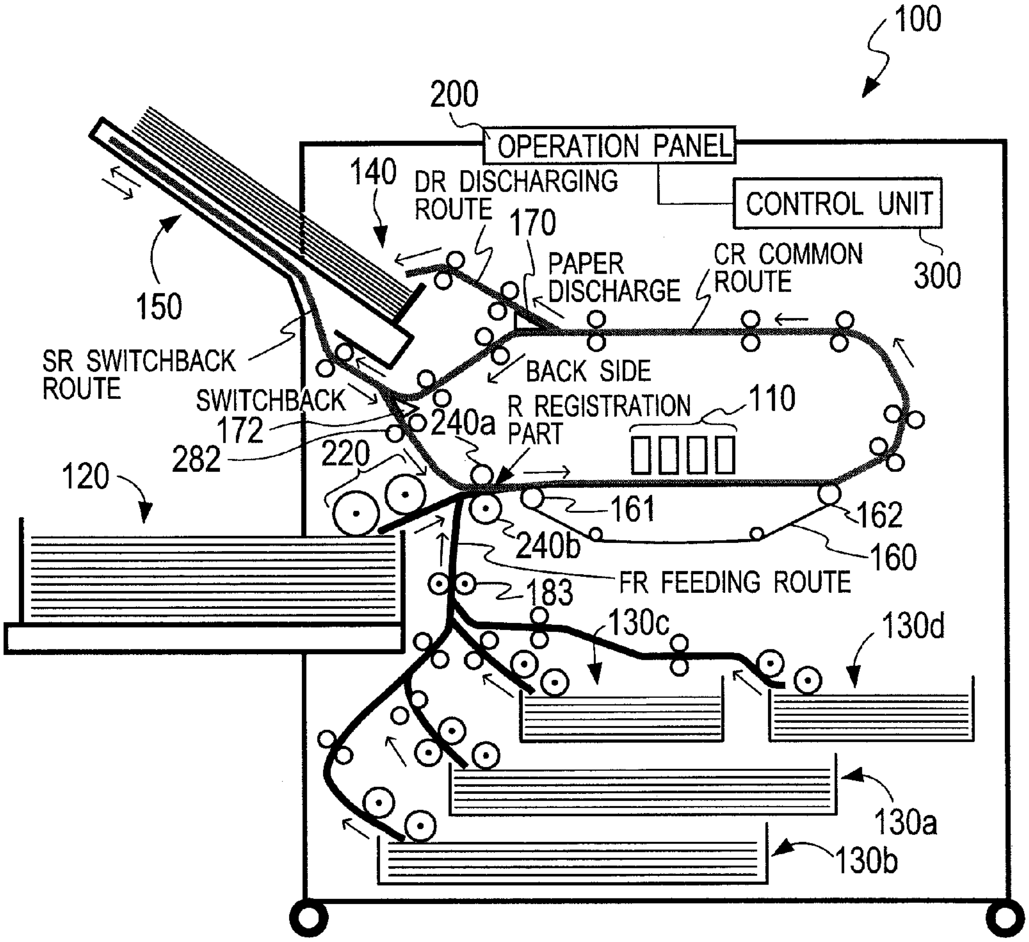
FIG. 1 is a configuration diagram showing an outline of a print sheet transfer path in a printing machine according to an embodiment.

An embodiment of the present invention will be described with reference to the drawings. FIG. 1 is a view schematically showing a transfer path for a record medium in a printing machine 100 according to the present invention. In the present embodiment, the printing machine 100 is an inkjet-type color line printer which includes multiple ink heads, each extending in a sheet width direction and having multiple nozzles formed therein. The inkjet-type color line printer performs printing line-by-line by ejecting black or color ink from corresponding ink heads, and forms multiple images on a record sheet on a transfer belt in a superimposing manner.

As shown in FIG. 1, the printing machine 100 is a machine configured to form an image on a surface of a record medium being transferred on a transfer path having a looped shape, and has the following record medium transfer routes: a feeding route FR configured to feed a record medium; a common route CR which extends from the feeding route FR, then passes a head unit 110, and finally reaches a discharging route DR; and a switchback route SR which is branched to be connected to the common route CR.

The feeding route FR is equipped with a paper feed mechanism, for feeding a record medium, including: a side paper supply table 120 exposed outside a side surface of a cabinet; multiple paper feed trays (130*a*, 130*b*, 130*c*, and 130*d*) provided in the cabinet; and a paper feed drive unit 183 configured to transfer a sheet on a paper feed path. The feeding route FR is further equipped with a discharge port 140 as a sheet discharge mechanism for discharging a printed record medium.

A record medium fed from any paper feed mechanism among the side paper supply table 120 and the paper feed trays 130 is transferred along the feeding route FR in the cabinet by a driving mechanism, such as a roller or the like, and is guided to a registration part R, which is a reference position for the leading edge of a record medium. The head unit 110 including multiple print heads is provided downstream of the registration part R in the direction of the transfer. The record medium is subjected to line-by-line image formation by respective inks ejected from the print heads while being transferred by a transfer belt 160 at a speed determined by print conditions. The transfer belt 160 is provided in a plane which the head unit 110 faces.

The printed record medium is further transferred on the common route CR by a driving mechanism, such as a roller or the like. In the case of one-sided printing in which only one side of a record medium is subjected to printing, the printed record medium is directly guided to the discharge port 140 through the discharging route DR to be discharged. Thus, printed record media are piled up one above the other on a paper receiving tray 150 provided as a receiving table of the discharge port 140 with the printed sides thereof facing down. The paper receiving tray 150 is in the form of a tray protruding from the cabinet, and has a certain thickness. The paper receiving tray 150 is inclined so that record media discharged from the discharge port 140 can be automatically piled up neatly along a wall formed on the lower side of the paper receiving tray 150.

On the other hand, in the case of double-sided printing in which both sides of a record medium are subjected to printing, the printed record medium is not guided to the discharging route DR at the time of completion of the front-side printing (a side which is first subjected to printing is referred to as a "front side, " and a side which is next subjected to printing is referred to as a "back side"), but is further transferred inside the cabinet to be sent out to the switchback route SR. For this reason, the printing machine 100 includes a switching mechanism 170 configured to switch the transfer path for back-side printing. A record medium which is not discharged by the switching mechanism 170 is drawn into the switchback route SR. The switchback route SR receives a record medium from the common route CR, and performs so-called switchback in which the record medium is inverted from front to back by moving the record medium forward and then backward. Then, the record medium is guided again to the registration part R via a switching mechanism 172 by a driving mechanism, such as a roller or the like, and then subjected to back-side printing by a procedure of the same sort to that for the front side. The record medium which has been subjected to the back-side printing and which has images formed on both sides thereof is guided to the discharge port 140 to be discharged. Thus, record media are piled up on the paper receiving tray 150 provided as a receiving table at the discharge port 140.

It should be noted that in the present embodiment, the switchback for double-sided printing is performed by utilizing a space provided in the paper receiving tray 150. The space provided in the paper receiving tray 150 has a covered structure so that a record medium cannot be taken out from the outside during the switchback. This prevents a user from drawing out a record medium in the switchback motion by mistake. Further, the paper receiving tray 150 is originally provided in the printing machine 100. Performing the switchback by utilizing a space in the paper receiving tray 150 eliminates the necessity of providing an additional space for the switchback in the printing machine 100. This prevents an increase in the size of the cabinet. Furthermore, since the discharge port and the switchback route are provided separately from each other, the switchback process for a sheet and the discharging process for another sheet can be performed in parallel.

In the printing machine 100, in the case of double-sided printing, a record medium having one side already printed is also transferred to the registration part R, which is the reference position for the front edge part of a record medium which is fed. Accordingly, immediately before the registration part R, there is a meeting point between a transfer path for a fed record medium and a path on which a sheet for back-side printing is circulated and transferred. Then, the registration part R sends out a record medium in the vicinity of the meeting point at which the feeding route FR meets the common route CR.

Figure 2:
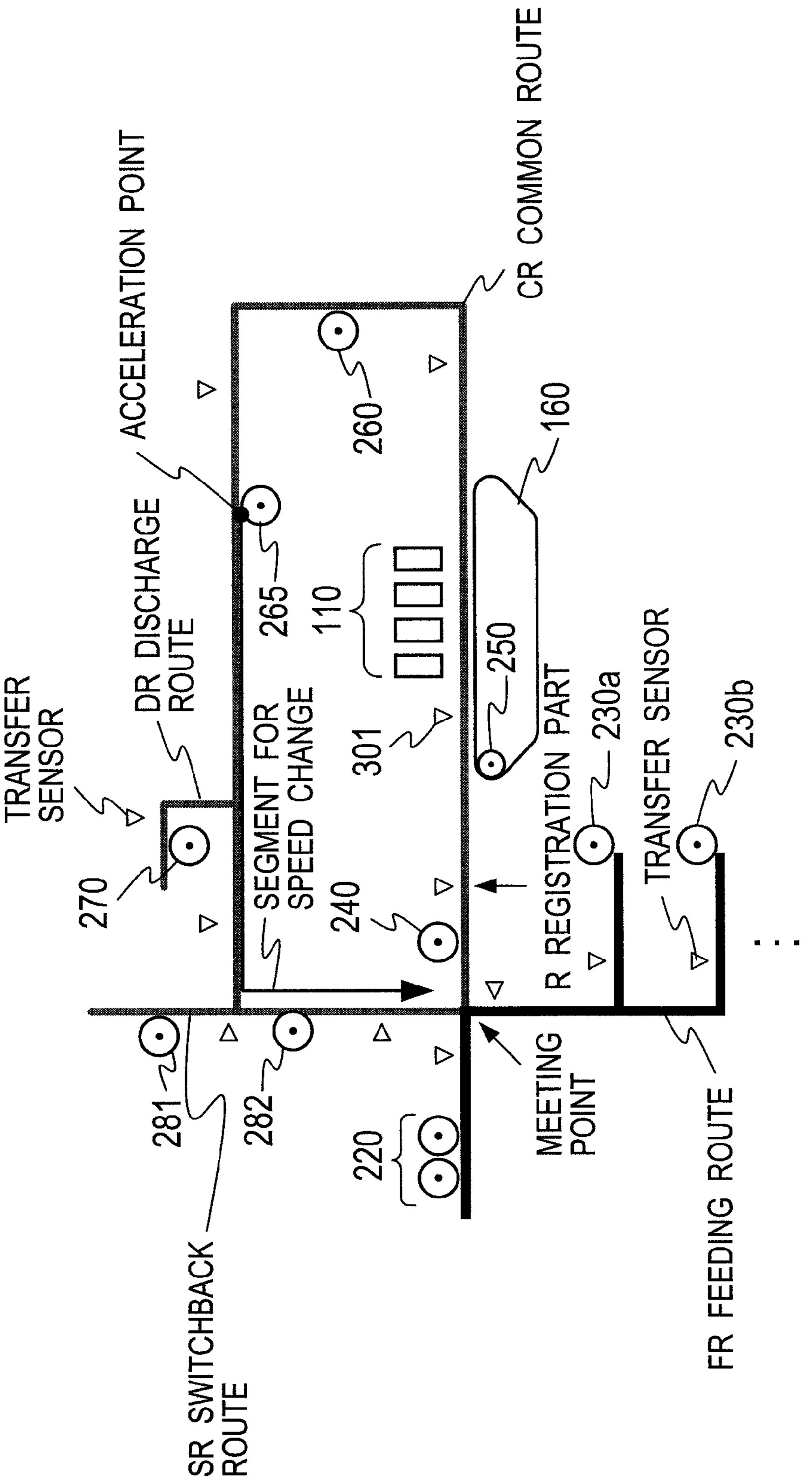
FIG. 2 is a view schematically showing a feeding route FR, a common route CR, and a switchback route SR according to the embodiment.

It should be noted that in the present embodiment, a path on the paper feed mechanism side of the above-described meeting point is referred to as the feeding route FR, and a path on the downstream side thereof is referred to as the common route CR. The transfer path has a looped shape, and includes the common route CR and the switchback route SR as described above. FIG. 2 is a view schematically showing the feeding route FR, the common route CR, and the switchback route SR. It should be noted that, in this drawing, some of the rollers of drive units are appropriately omitted.

The feeding route FR is provided with a side paper feed drive unit 220 configured to feed a sheet from the side paper supply table 120, and a tray-1 drive unit 230*a*, a tray-2 drive unit 230*b*, . . . configured to feed sheets from the paper feed trays (130*a*, 130*b*, 130*c*, and 130*d*). These constitute a paper feeder configured to send out a record medium to the registration part R.

Further, each of the above-described drive units (the tray-1 drive unit 230*a*, the tray-2 drive unit 230*b*, . . . ) on the feeding route FR is provided with a driving mechanism which is composed of multiple rollers or the like, and is configured to take in record media piled up one above the other on a paper supply table or a paper feed tray one by one, and then to transfer the record media in the direction of the registration part R. Each drive unit can be independently actuated. In accordance with a paper feed mechanism which feeds a sheet, a required drive unit is actuated.

Meanwhile, on the feeding route FR, multiple transfer sensors are disposed so that a paper jam on the feeding route FR can be detected. Each transfer sensor is a sensor configured to detect the presence or absence of a record medium or detect the leading edge of a record medium. For example, multiple transfer sensors are arranged on the transfer path at appropriate intervals so that if, after a transfer sensor provided on the paper feed side has detected a record medium, a transfer sensor on the downstream side in the direction of transfer does not detect a record medium within a predetermined period of time, a determination can be made that a paper jam has occurred. Of these transfer sensor, a registration sensor located upstream of the registration part R, which is configured to send out a record medium, measures the size of a record medium being transferred. For example, the size of a passing record medium can be measured based on the passage speed and time of the record medium. Further, a transfer sensor is provided in the vicinity of the paper feed unit so that if, after the side paper feed drive unit 220, the tray-1 drive unit 230*a*, or the like has been actuated, the transfer sensor does not detect a record medium within a predetermined period of time, a determination can be made that a paper jam (paper feed error) has occurred. It should be noted that disposing a transfer sensor for each paper feed unit makes it possible not only to detect the fact that a paper jam has occurred on the feeding route FR but also to identify where on the feeding route FR the paper jam has occurred.

The common route CR constitutes apart of a cyclic transfer path, and is a route extending from the feeding route FR configured to feed a record medium, then passing the head unit 110, and finally reaching the discharging route DR. On this common route CR, an image is formed on the upper surface of a record medium. The common route CR is provided with a registration drive unit 240 configured to guide a record medium to the registration part R, a belt drive unit 250 which is actuated to endlessly move the transfer belt 160 provided in a plane that the head unit 110 faces, first and second upper surface transfer drive units 260 and 265 disposed in that order in the direction of transfer, an upper surface discharging drive unit 270 configured to guide a printed sheet to the discharge port 140, and a drive unit configured to draw a record medium into the switchback route SR for back-side printing. Each of the drive units is provided with a driving mechanism composed of one or more rollers or the like, and transfers record media along the transfer path one by one. Each of the drive units can be independently actuated. In accordance with the situation of transfer of a record medium, a required drive unit is actuated.

Further, the common route CR is also provided with multiple transfer sensors so that a paper jam on the common route CR can be detected. Moreover, it is possible to check whether or not a record medium is appropriately transferred to the registration part R. On the common route CR, a transfer sensor is provided for each drive unit. This makes it possible to identify at which drive unit on the common route CR a paper jam has occurred.

The switchback route SR is branched from and connected to the common route CR, and is an inverting path and a transfer mechanism configured to receive a record medium from the common route CR and to invert the record medium from front to back by moving the record medium forward and then backward (switchback) and returning the record medium to the common route CR. This switchback route SR is provided with a switchback drive unit 281 and a paper refeed drive unit 282 configured to invert the record medium and guide the record medium to the meeting point. On the switchback route SR, transfer can be performed at a speed different from that on the common route CR. This enables acceleration or deceleration of a record medium when the record medium is transferred from the common route CR, and also enables the expansion or reduction of pause time during the switchback.

It should be noted that in the present embodiment, it is configured that printing can be continuously performed at predetermined intervals by scheduling in such a manner that, before a preceding record medium is discharged, a subsequent record medium is fed, but not in such a manner that, after a record medium is fed, then subjected to printing, and finally discharged, a subsequent record medium is fed. Accordingly, in usual scheduling for double-sided printing, a space is ensured in advance when a record medium for front-side printing is fed so that a position at which a record medium returned from the switchback route SR is inserted can be ensured. This enables this machine to perform front-side printing and back-side printing in parallel and ensure productivity as high as half of that for one-sided printing.

The transfer belt 160 is passed over a drive roller 161 and a driven roller 162 which are respectively disposed at front and back ends of a plane which the head unit 110 faces, and rotates in the clockwise direction in the drawing. Moreover, the head unit 110 is disposed to face the upper surface of the transfer belt 160. The head unit 110 includes ink heads of four colors, respectively, arranged in the travel direction of the belt, and is configured to form a color image by superimposing multiple images.

Furthermore, as shown in FIG. 1, the printing machine 100 includes a control unit 300. This control unit 300 is an arithmetic module which is made of: hardware including a processor, such as a CPU and a DSP (Digital Signal Processor), a memory, other electronic circuit, and the like; software, such as programs having such functions; a combination of hardware and software; or the like. The control unit 300 virtually constructs various function modules by appropriately reading and executing programs, and uses the constructed function modules to perform: processing relating to image data; the control of operation of other units; and various kinds of processing on operations by a user. Moreover, an operation panel 200 is connected to the control unit 300 so that instructions and setting operations can be received from a user through the operation panel 200.

(Ejection Timing Control)

Figure 3:
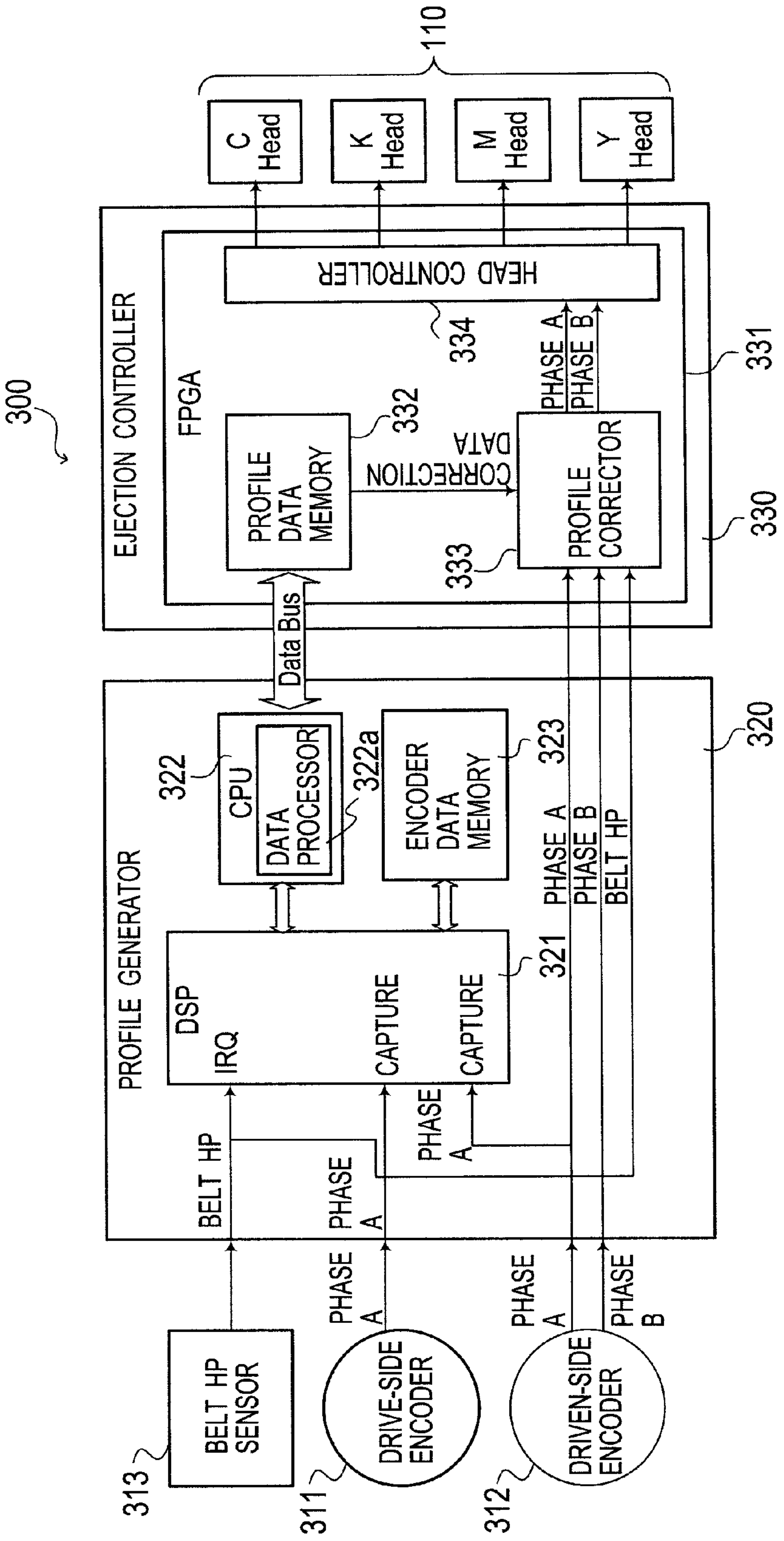
FIG. 3 is a block diagram showing the internal configuration of a control unit according to the embodiment.
Figure 4:
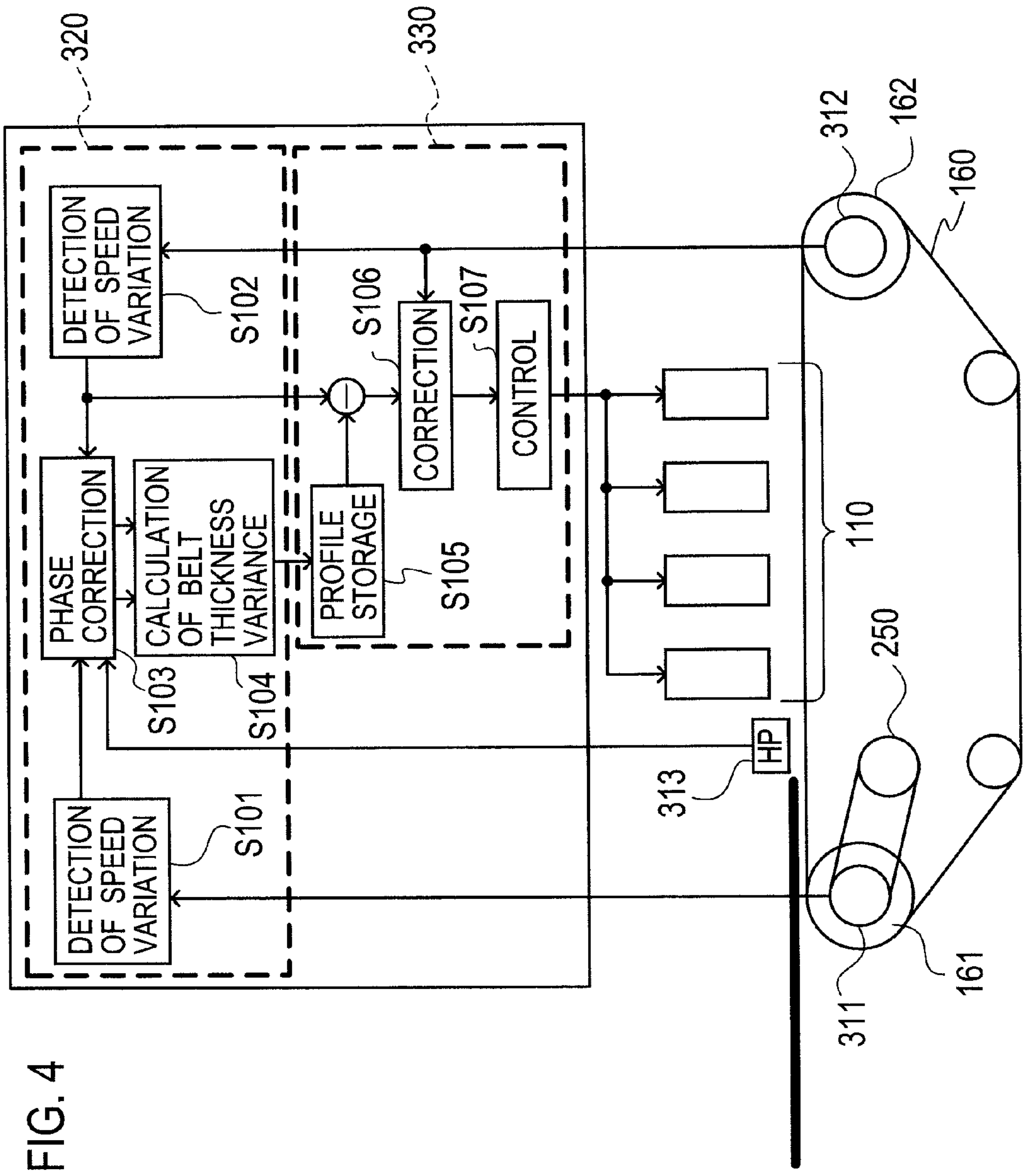
FIG. 4 is an explanatory diagram showing an operation of ink ejection timing control according to the embodiment.

Next, control on the timing of ejection in the above-described head unit 110 will be described. FIG. 3 is a functional block diagram showing modules relating to ejection timing control in the head unit 110, and FIG. 4 is an explanatory diagram schematically showing functions and operations thereof. It should be noted that the term "module" used in this description refers to a functional unit which is made of hardware, such as devices and instruments, software having such functions, or a combination of these hardware and software, and which is intended to achieve predetermined operations.

As shown in FIG. 3, the control unit 300 is provided as a module configured to adjust the respective ink ejection timings of the ink heads of the head unit 110. This control unit 300 includes a profile generator 320 and an ejection controller 330.

The profile generator 320 includes a DSP 321, a CPU 322, and an encoder data memory 323. Meanwhile, the ejection controller 330 includes an FPGA 331. In this control unit 300, the DSP 321 calculates belt profile data. The calculated belt profile data is transferred from the CPU 322 to the FPGA 331 through a data bus. The FPGA 331 performs an encoder output correction based on the belt profile data.

The DSP 321 extracts pulse width data of a drive-side encoder and a driven-side encoder as speed data, and also functions as a phase inversion data extractor configured to extract, from this speed data, phase inversion data in which the phase periodically inverts at a single point on the transfer belt 160.

The CPU 322 also operates as a data processor 322*a*. This data processor 322*a* is a module configured to calculate speed ratio data from the speed data and to perform processing, such as averaging, digitization, and the like, on such data. The encoder data memory 323 is a memory device configured to record pulse width data on the drive-side encoder and the driven-side encoder as speed data.

A drive-side encoder 311 and a driven-side encoder 312 are provided as a detecting part for detecting the respective angular velocities of the drive roller 161 as a first roller and the driven roller 162 as a second roller. Each of these encoders 311 and 312 is connected to the profile generator 320 or the ejection controller 330.

As shown in FIG. 3, a detection signal from the drive-side encoder 311 is inputted to the DSP 321, and detection signals from the driven-side encoder 312 are inputted to both the DSP 321 and the FPGA 331. Further, the DSP 321 also receives a home position signal sensed by a belt HP sensor 313 configured to sense one mark (reference mark) per belt cycle.

The DSP 321 extracts speed ratio data on angular speed, which has a frequency corresponding to the speed variation of the transfer belt 160, from the ratio of the angular velocities detected respective by the encoders 311 and 312, and sends out this data from the CPU 322 through the data bus to a profile data memory 332. The profile data memory 332 is a storage configured to store belt profile data (speed ratio data). The stored belt profile data is read out at the time of printing to be inputted to a profile corrector 333.

The profile corrector 333 is a module configured to correct the detection signals inputted from the driven-side encoder 312 on the basis of the speed ratio data stored in the profile data memory 332 so that a misalignment among multiple images on the transfer belt 160 may be reduced, and configured to input the corrected detection signals to a head controller 334. The head controller 334 is a print controlling part for controlling, based on this corrected detection signals, the timing at which each image is formed by the head unit 110. The head unit 110 forms multiple images on a record sheet under the control of the head controller 334.

Figure 5:
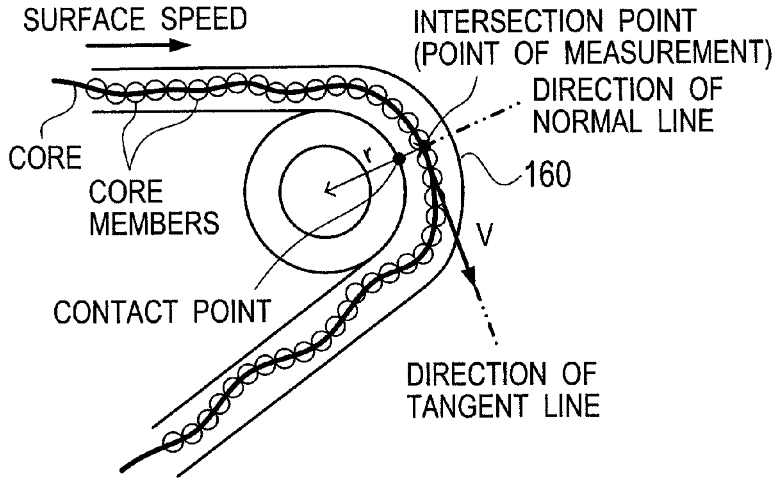
FIG. 5 is a cross-sectional view showing a core member variance inside a transfer belt according to the embodiment.
Figure 6:
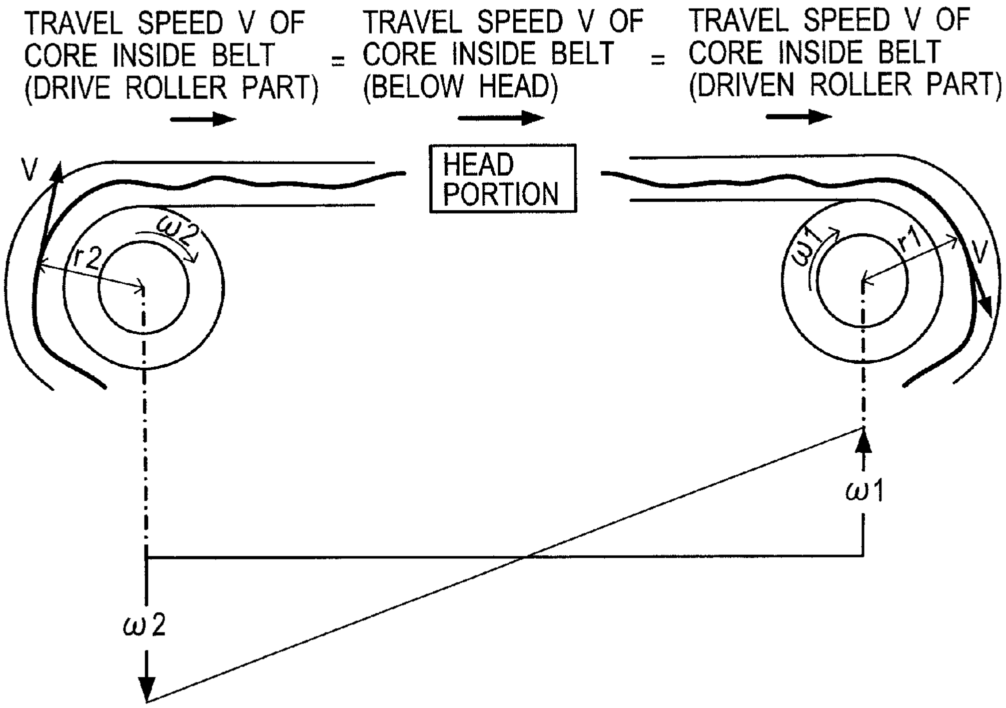
FIG. 6 is an explanatory diagram relating to a speed ratio at the time of the generation of belt profile data according to the embodiment.

Here, a belt profile generated by the profile generator 320 will be described in detail. In the driving of the transfer belt 160, the rotational speed of a driven shaft depends on the position of core members inside the transfer belt 160. Strictly speaking, the "position of the core member" is not the central position of the core members inside the belt but the position which has the same speed as that of a belt surface. Specifically, as shown in FIGS. 5 and 6, the "position of core member" is the position of an intersection point between series of core members (core portion) and the normal line at a contact point of the inner circumferential surface of the transfer belt 160 with each of the drive roller 161 and the driven roller 162, the drive roller 161 and the driven roller 162 respectively disposed at front and back ends of a surface of the transfer belt 160 which faces the head unit 110. Then, a component in the direction of the tangent line at each of the contact points is measured as the travel speed of the core member at the position of an intersection point.

Figure 7:
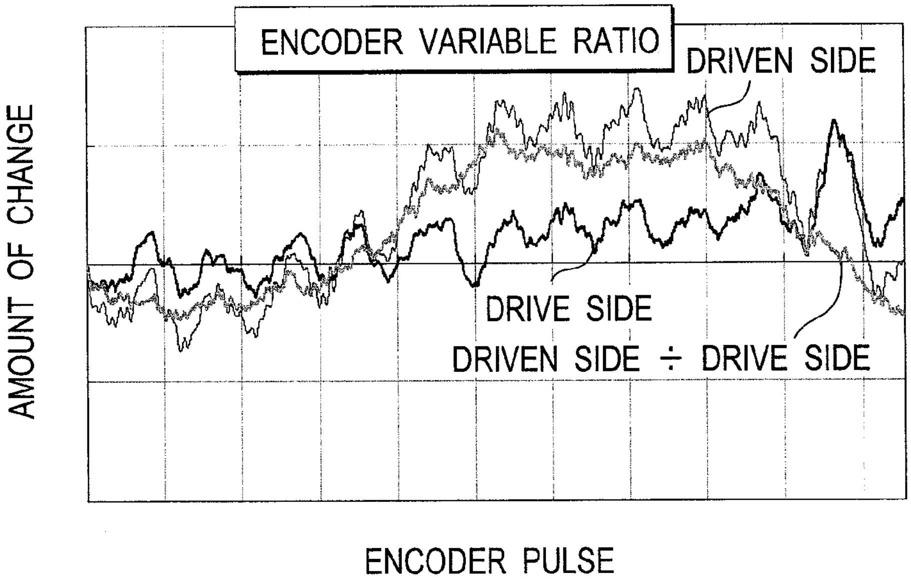
FIG. 7(*a*) is a graph showing a value and a speed ratio of each encoder which are used at the time of the generation of the belt profile data according to the embodiment, and (b) is a graph showing the contents of the belt profile data generated from these.
Figure 7:
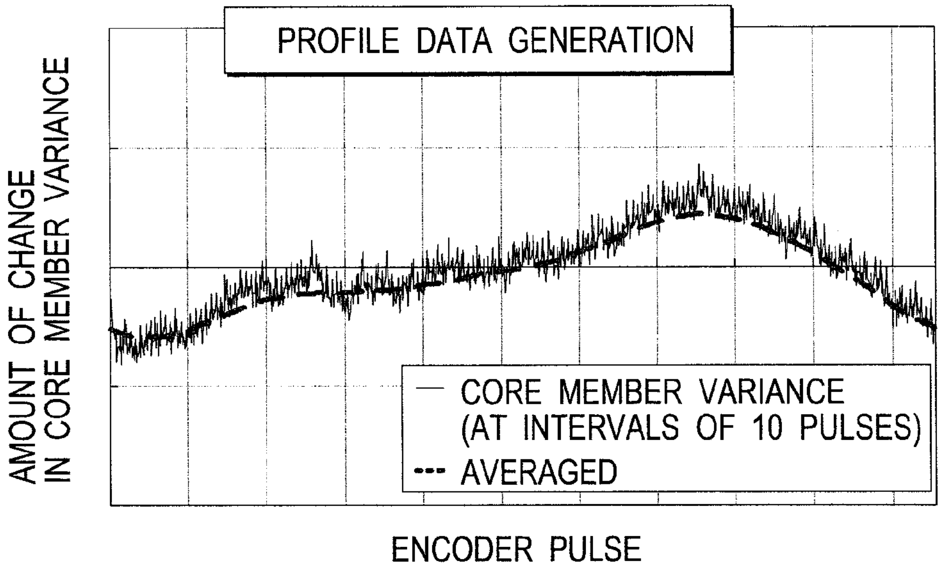
Figure 8:
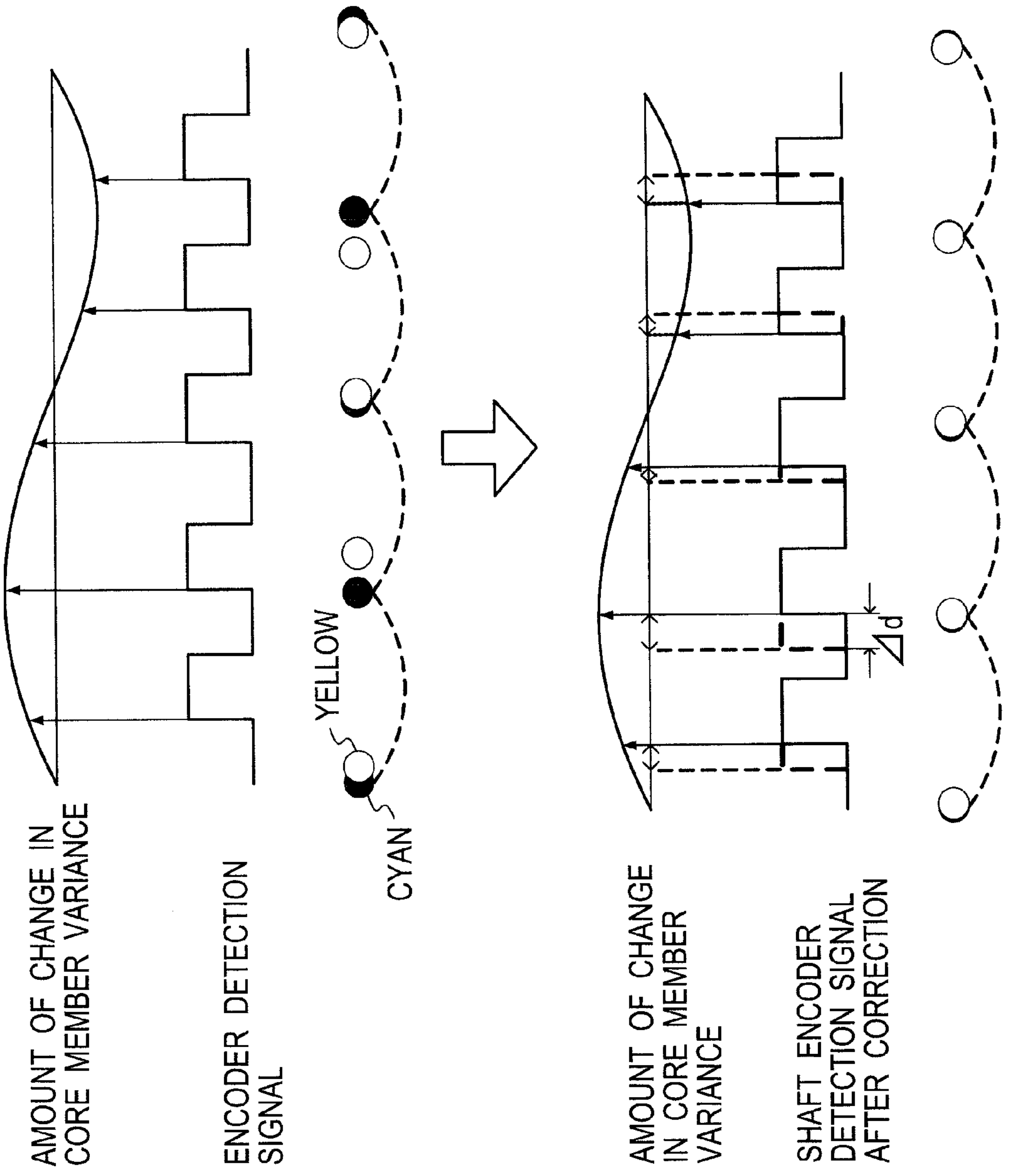
FIG. 8 is an explanatory diagram relating to an encoder signal correction at the time of the ink ejection timing control according to the embodiment.
Figure 9:
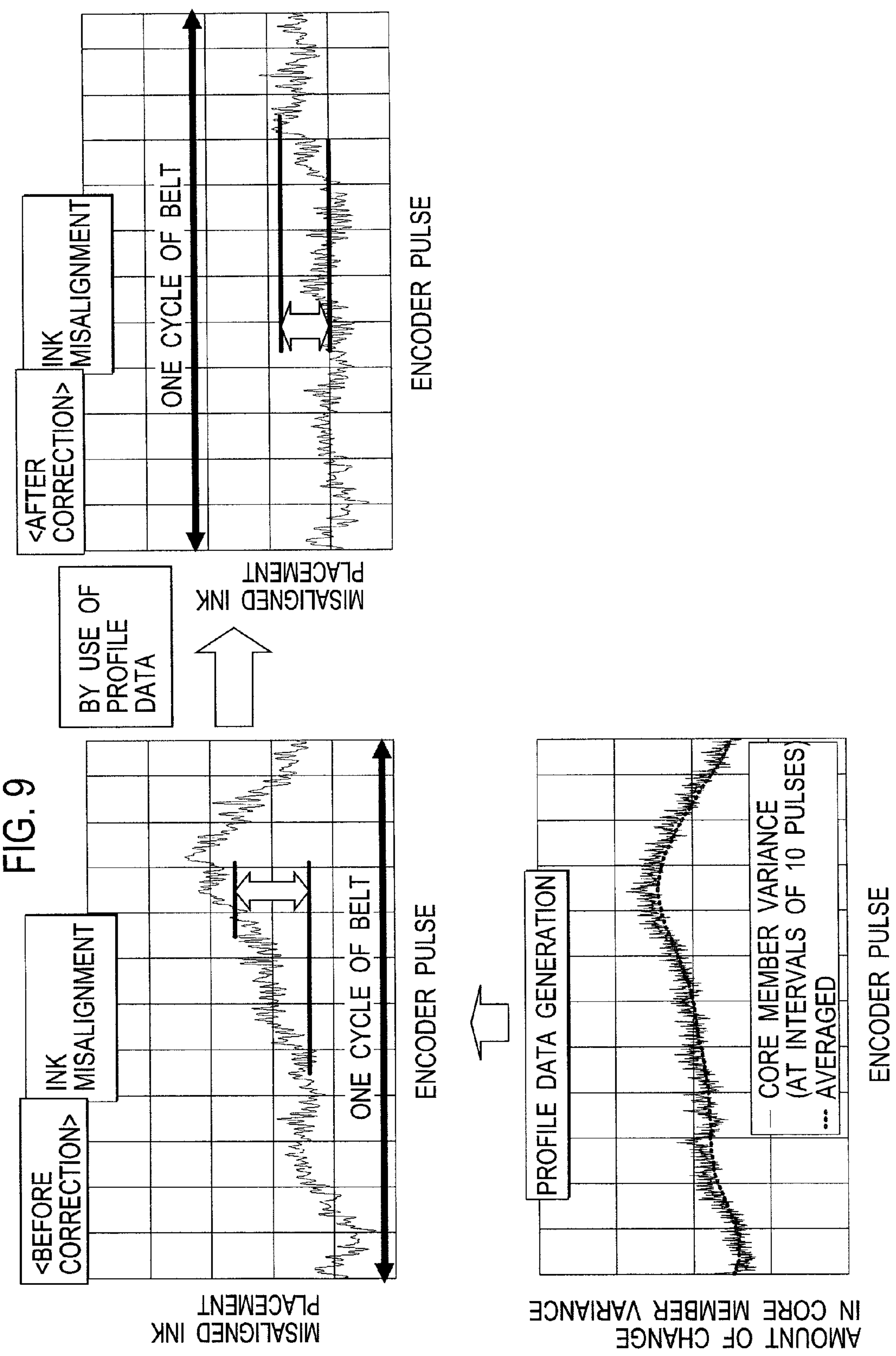
FIG. 9 is a graph showing changes in ink misalignment as the operation and effect of the embodiment.

The above-described position of the core member is a parameter specific to the belt. As shown in FIG. 7, by recording the ratio between the measured travel speeds at two points on the core member as a belt profile, an ink misalignment can be estimated which is caused by change in the angular speed of the driven roller shaft that depends on the position of the core member. As shown in FIG. 8, by controlling the ejection timings of the respective ink heads based on this, the ink misalignment can be corrected as shown in FIG. 9.

In the present embodiment, such a belt profile is generated using the ratio between the angular velocities of the drive roller 161 and the driven roller 162. Specifically, when the angular speed of the driven side is ω1, the angular speed of the drive side is ω2, the radius to the core member on the driven side is r1, the radius to the core member on the drive side is r2, and the surface speed of the transfer belt 160 is v, the following relationships are satisfied:

$$\text{drive side: } \omega 2 = V/r2$$

$$\text{driven side: } \omega 1 = V/r1$$

With regard to the ratio between the drive side and the driven side, the following relationship is satisfied:

$$\omega 1/\omega 2 = r2/r1$$

Thus, the speed ratio between the rollers equals to the ratio in the core member variance.

At the time of generating profile data, the DSP 321 obtains the variable ratio of the driven-side encoder to the drive-side encoder, and records a temporal change in the speed ratio therebetween, thus recording a temporal change (a change in a direction of the length of the transfer belt 160) in the core member variance as a profile. In the present embodiment, data on the speed ratio is recorded as data for one belt cycle. It should be noted that, with regard to the timing of acquiring this belt profile data, the trigger may be, for example, the time of shipment from a factory, the time of start of printing, the time of an environmental change, the time of a temporal change, the time of the maintenance, the time of raising or lowering a platen, or the like.

At the time of printing, the profile corrector 333 reads the belt profile data recorded in the profile data memory 332, and, based on this, corrects the detection signal of the driven-side encoder such that the detection signal is advanced or delayed in accordance with the speed ratio as shown in FIG. 8. The corrected signals are inputted to the head controller 334. The head controller 334 adjusts the ejection timing based on the inputted signal.

(Operations of Printing Machine)

Operations, functions, and effects of the printing machine 100 according to the first embodiment which has the above-described configuration will be described with reference to the aforementioned FIG. 4.

First, belt profile data is generated. With regard to the timing of generating this belt profile data, the trigger may be, for example, the time of shipment from a factory, the time of start of printing, the time of an environmental change, the time of a change over time, the time of maintenance, the time of raising or lowering a platen, or the like.

To be more specific, the profile generator 320 of the control unit 300 detects a signal from each of the encoders. At this time, the detection signal from the drive-side encoder 311 is inputted to the DSP 321 (S101), and the detection signal from the driven-side encoder 312 is inputted to the DSP 321 (S102). Further, the DSP 321 also receives the home position signal sensed by the belt HP sensor 313, and performs a phase correction (S103).

Subsequently, the DSP 321 extracts, from the ratio between the respective angular velocities detected by the encoders 311 and 312, speed ratio data on angular speed and phase inversion data, which have a frequency corresponding to the speed variation of the transfer belt 160. The CPU 322 processes the data to generate a belt profile, and then sends out this belt profile to the profile data memory 332 through the data bus (S104). The profile data memory 332 stores the received belt profile data (S105).

Then, print processing using the belt profile data generated as described above is performed by the following procedure. First, when the print processing is started, the stored belt profile data is read out to be inputted to the profile corrector 333.

The profile corrector 333 corrects the encoder detection signal inputted from the driven-side encoder 312 on the basis of the speed ratio data stored in the profile data memory 332 so that a misalignment among multiple images on the transfer belt 160 may be reduced, and inputs the corrected signal to the head controller 334 (S106). In this correction, a correction value in the belt profile data is read out in accordance with the rotation period of the transfer belt 160 in accordance with the home position signal, and the encoder detection signal inputted from the driven-side encoder 312 is advanced or delayed in accordance with the correction value as shown in FIG. 8 to be inputted to the head controller 334.

The head controller 334 controls, based on the above-described corrected encoder detection signal, the timing at which each image is formed by the head unit 110 (S107). The head unit 110 ejects inks under the control of this head controller 334 to form multiple images on a record sheet.

(Generation of Belt Profile Data)

Figure 10:
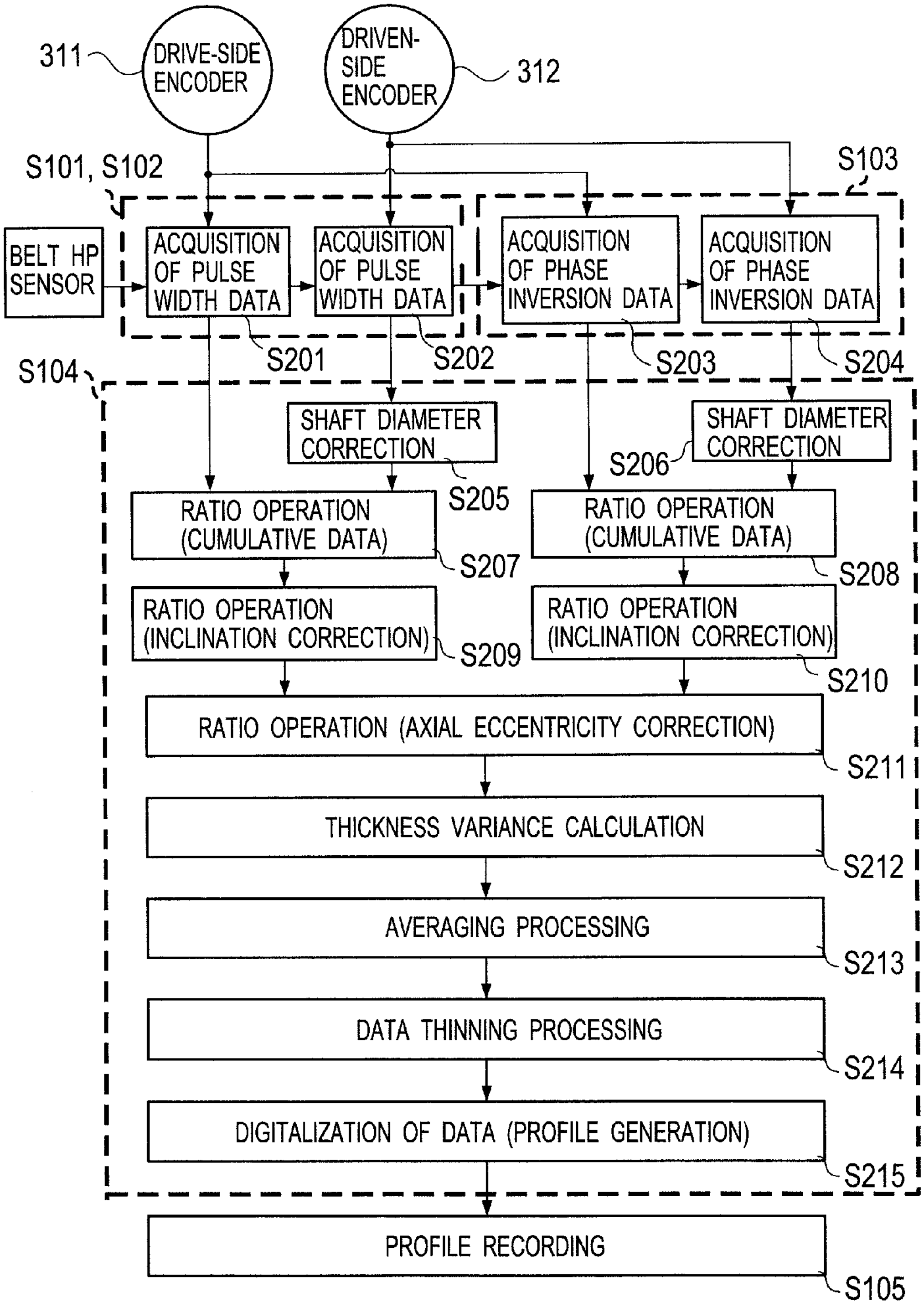
FIG. 10 is a flowchart showing a procedure for generating the belt profile data according to the embodiment.

Next, a phase correction (S103) and speed ratio data extraction (S104), which are performed in the generation of the above-described belt profile data, will be described in detail. FIG. 10 is a flowchart showing a procedure for generating belt profile data in the aforementioned steps S101 to S105 in FIG. 4.

First, as shown in FIG. 4, in steps 5101 and S102, a predetermined amount of pulse width data (speed data) is stored with regard to each of the drive-side encoder 311 and the driven-side encoder 312. Then, in step 5103, phase inversion data on each of the encoders is obtained from the data.

Figure 11:
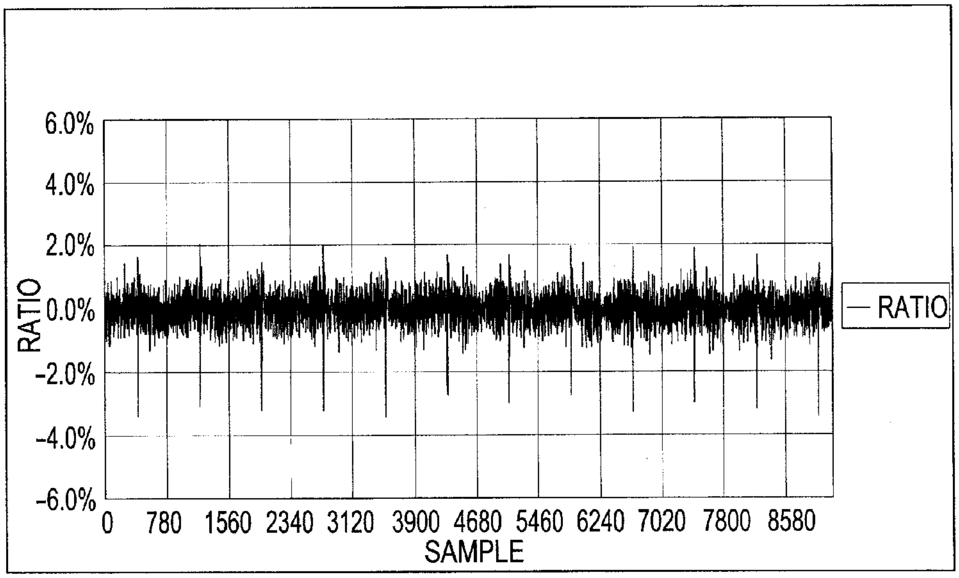
FIG. 11(*a*) is a graph showing pulse width data (speed data), and (b) is a graph showing cumulative data.
Figure 11:
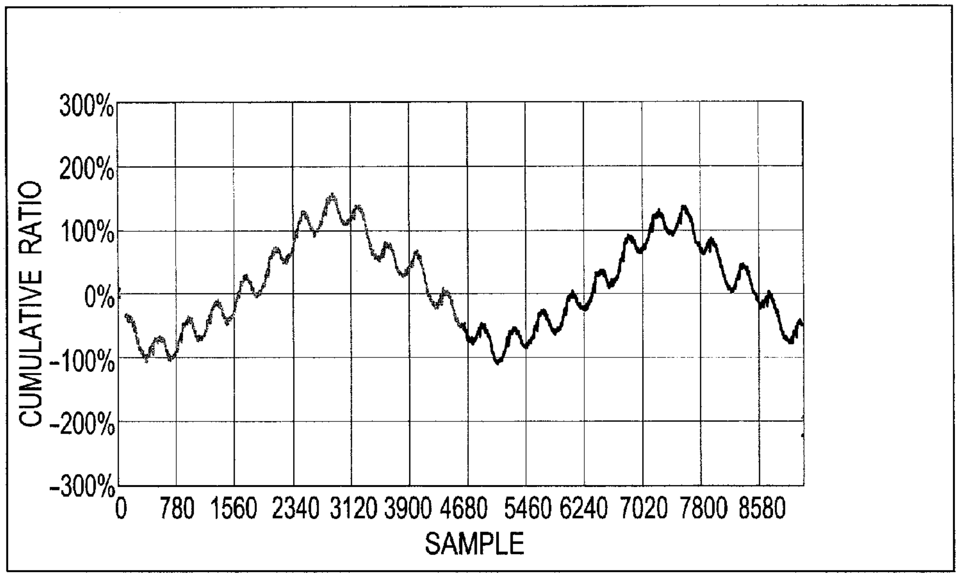
Figure 12:
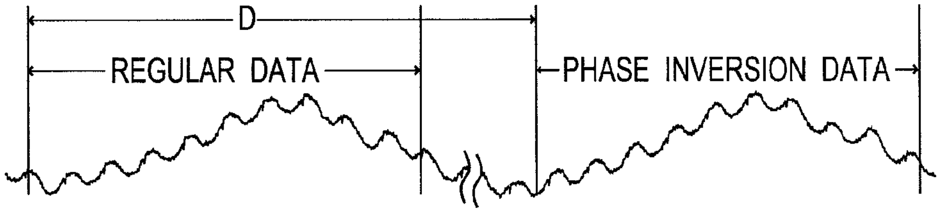
FIG. 12 is an explanatory diagram showing averaging of the pulse width data speed data according to the embodiment.

To be more specific, as shown in FIG. 10, in steps S201 and S202, pulse width data (FIG. 11(*a*)) from each of the encoders is stored in the encoder data memory 323. Then, in steps S203 and S204, the data processor 322*a* of the CPU 322 extracts phase inversion data in which the phase periodically inverts at a single point on the transfer belt 160. In these steps, as shown in FIG. 12, after pulse width data for one belt cycle is obtained as normal data, the belt is rotated by a distance D with the recording of pulse width data temporarily stopped, and then the recording of pulse width data is started again. Data for one belt cycle thus obtained is obtained as phase inversion data. In the present embodiment, this distance D is stored as an actual measured value in a memory, and read out at the time of generating profile data.

Figure 13:
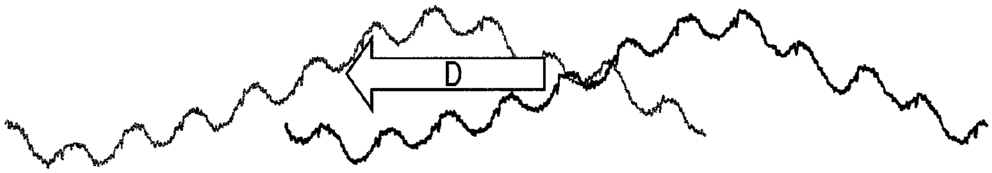
FIG. 13 is an explanatory diagram showing the averaging of the pulse width data speed data according to the embodiment.
Figure 13:
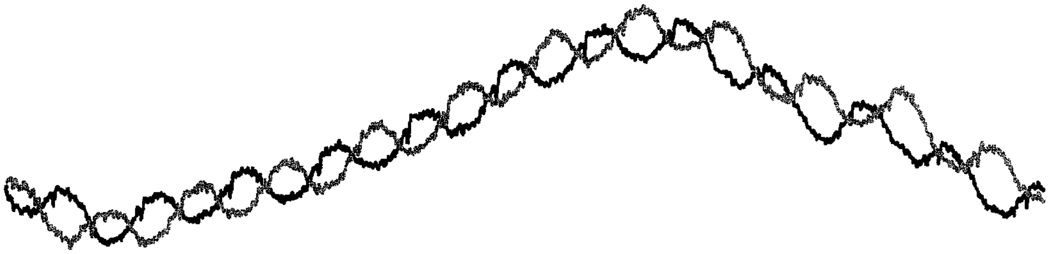
Figure 14:
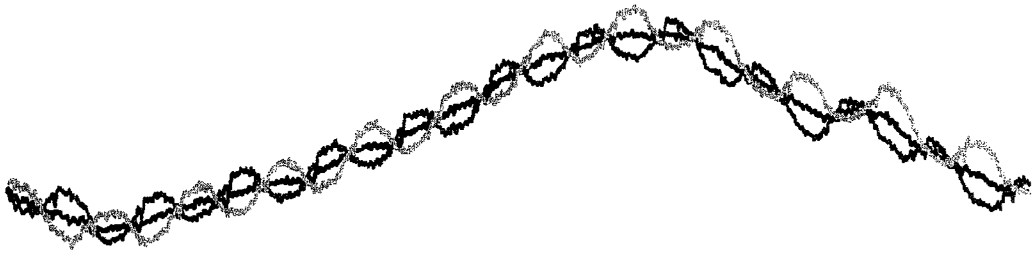
FIG. 14 is an explanatory diagram showing the averaging of the pulse width data speed data according to the embodiment.
Figure 14:
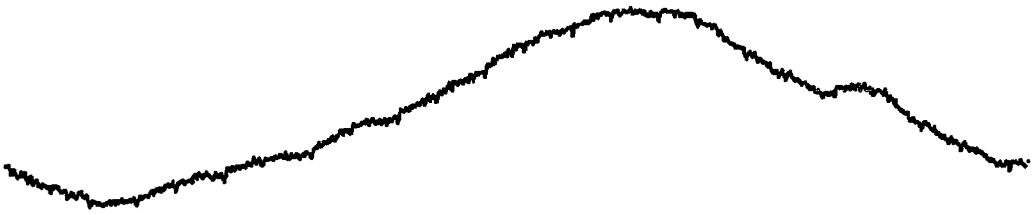

Further, as shown in FIGS. 13(*a*) and 13(*b*), the phase inversion data is superimposed on the normal pulse width data. Then, as shown in FIGS. 14(*a*) and 14(*b*), an eccentricity component (phase inversion data) which is due to phase inversion is canceled out from the original encoder data in order to perform averaging.

For each of the pulse width data and phase inversion data on the driven-side encoder which have been thus obtained, a shaft diameter correction is performed as shown in FIGS. 10 (S205 and S206). In this shaft diameter correction, since the number of pulses for one belt cycle differs between the drive roller and the driven roller due to the difference in shaft diameter therebetween, an adjustment is performed in accordance with the difference in the number of pulses. Specifically, sample numbers of the data are corrected in accordance with the ratio between the respective average values of pulses of the encoders.

Subsequently, a ratio operation is performed on the data thus subjected to the shaft diameter correction, and cumulative data such as shown in FIG. 11(*b*) is calculated (S207 and S208). In this ratio operation, the ratio between the pulse width of the drive-side encoder and that of the driven-side encoder is calculated. In the calculation of the cumulative data, an arbitrary point, for example, an HP or the like, is set as a reference point, and values of each pulse width data are subjected to cumulative calculation one after another to find speed ratios with respect to this reference point over the entire loop of the transfer belt 160.

Figure 15:
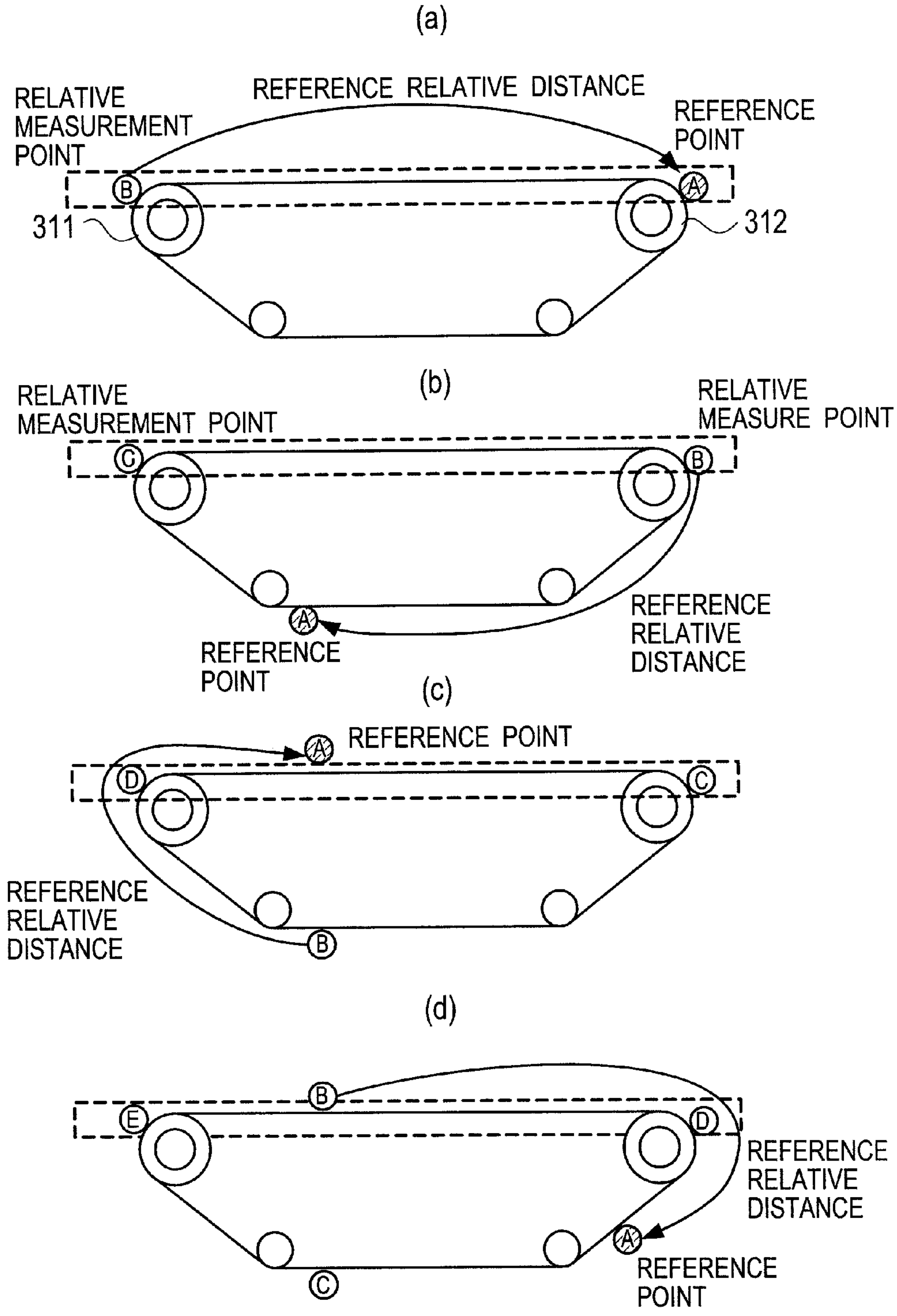
FIG. 15 is an explanatory diagram showing the calculation of cumulative data according to the embodiment.

Specifically, as shown in FIGS. 15(*a*) to 15(*d*), an arbitrary point on the transfer belt 160 is set as a reference point A, and the distance between two arbitrary measurement points A and B (here, the distance between the drive-side encoder and the driven-side encoder) is set as a reference relative distance. Moreover, a speed when the reference point A is positioned at any one (in FIG. 15, the driven-side encoder) of the two measurement points is set as a reference speed V0, and the ratio of the speed at one measurement point of the two measurement points to that at the other measurement point is referred to as a relative speed ratio Vn+1/Vn.

Further, the relative speed ratio Vn+1/Vn between the encoders is sequentially accumulated on the reference speed V0 starting from the reference point A in the circumferential direction of the transfer belt 160 at intervals of the reference relative distance, and the speed ratio of each point relative to the reference point A is calculated over the entire loop of the transfer belt 160. Thus, the speed ratio with respect to the reference point can be found for each of the points over the entire belt by cumulatively multiplying speed ratios between the two measurement points, such as the speed ratio of point B with respect to the reference point A, the speed ratio of point C with respect to point B, the speed ratio of point D with respect to point C, . . . , at intervals of the reference relative distance.

Incidentally, since the encoders continue to obtain pulse widths even during travelling in the reference relative distance, data do not appear in order of the above-described processing of cumulative operation as shown in Table 1.

TABLE 1

| Sample | Measurement points | Relative speed ratio (%) |
|---|---|---|
| 0 | A/B | R0 |
| 1 | D/E | R1 |
| 2 | F/G | R2 |
| 3 | B/C | R3 |
| 4 | E/F | R4 |
| . | . | . |
| . | . | . |
| . | . | . |
| n | C/D | Rn |

Figure 16:
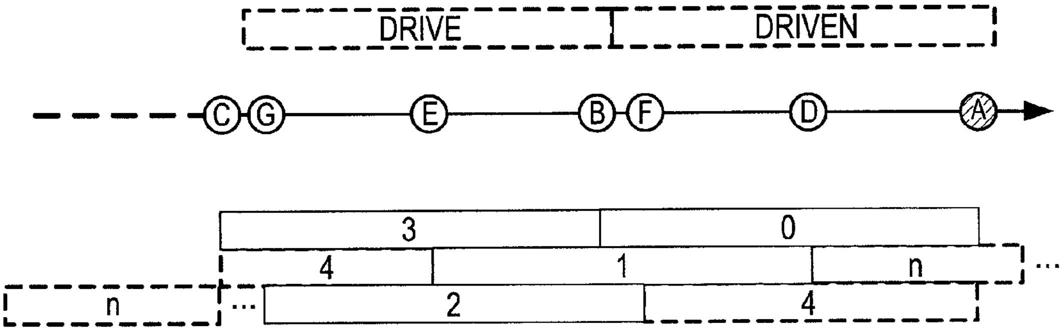
FIG. 16 is an explanatory diagram showing the sorting of data according to the embodiment according to the embodiment.
Figure 17:
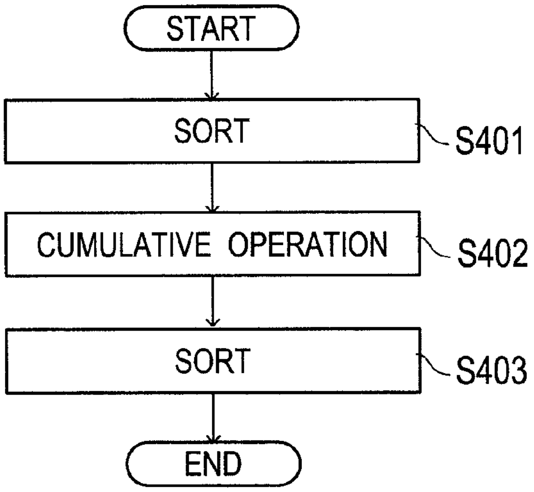
FIG. 17 is a flowchart showing the calculation of the cumulative data according to the embodiment.

In other words, as shown in FIG. 16, subsequent to a speed ratio R0=VA/VB, a speed ratio of VD/VE is obtained, not a speed ratio of VC/VB, and then a speed ratio of R2=VF/VG is obtained. In such a way, data do not appear in order of the processing of cumulative operation. For this reason, in the present embodiment, as shown in FIG. 17, after a predetermined amount of pulse width data is obtained and accumulated in order of appearance, data obtained at intervals of the reference relative distance are taken out in order to be sorted as shown in Table 2 (S401), and speed ratios are multiplied one after another in the sorted order to be accumulated (S402). After that, predetermined data processing is executed using the cumulative data, and then the sorting is performed again as shown in Table 3 (S403). Thus, a belt profile is generated.

TABLE 2

| Sample | Measurement points | Relative speed ratio (%) | Accumulation (%) |
|---|---|---|---|
| 0 | A/B | R0 | C0 = 1.0 × R0 |
| 3 | B/C | R3 | C1 = C0 × R3 |
| n | C/D | Rn | C2 = C1 × Rn |
| 1 | D/E | R1 | C3 = C2 × R1 |
| 4 | E/F | R4 | C4 = C3 × R4 |
| 2 | F/G | R2 | C5 = C4 × R2 |
| . | . | . | . |
| . | . | . | . |
| . | . | . | . |

TABLE 3

| Sample | Measurement points | Relative speed ratio (%) | Accumulation (%) |
|---|---|---|---|
| 0 | A/B | R0 | C0 = 1.0 × R0 |
| 1 | D/E | R1 | C3 = C2 × R1 |
| 2 | F/G | R2 | C5 = C4 × R2 |
| 3 | B/C | R3 | C1 = C0 × R3 |
| 4 | E/F | R4 | C4 = C3 × R4 |
| . | . | . | . |
| . | . | . | . |
| . | . | . | . |
| n | C/D | Rn | C2 = C1 × Rn |

The aforementioned predetermined data processing performed on the cumulative data includes an inclination correction (S209 and S210) and a zero correction. Subsequently, a shaft eccentricity correction is performed using the phase inversion data to average the original encoder data (S311). Specifically, as shown in FIG. 12 and FIG. 13, the phase inversion data is slid by a distance D to be superimposed on the original encoder data. Thus, as shown in FIGS. 14(*a*) and 14(*b*), an eccentricity component (phase inversion data) which is obtained by phase inversion is canceled from the original encoder data (FIG. 14(*a*)) in order to perform averaging (FIG. 14(*b*)).

Figure 18:
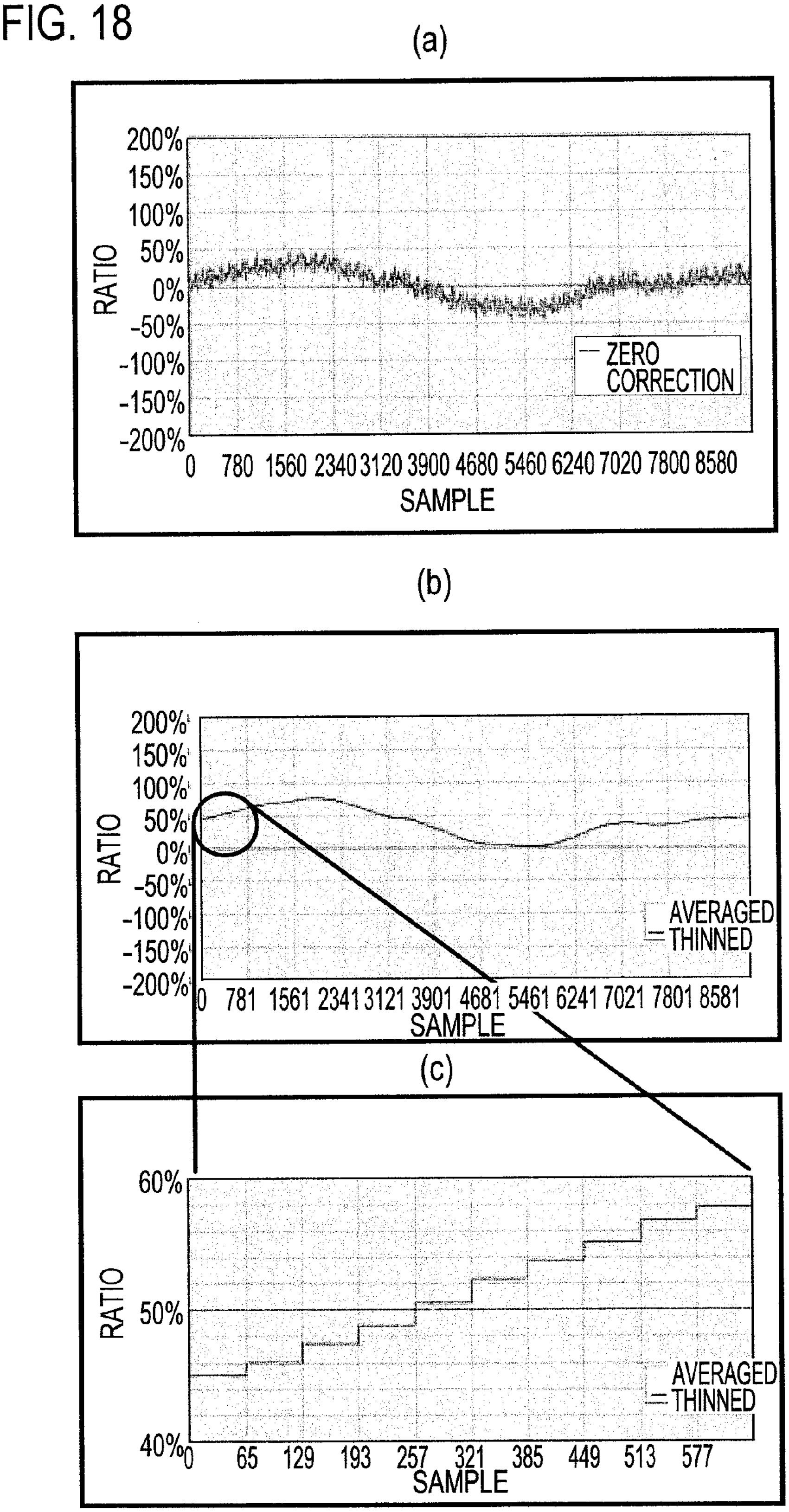
FIG. 18(*a*) is a graph showing averaged cumulative data, (b) is a graph showing averaged data, and (c) is a graph showing thinned data.

Then, the data thus averaged (subjected to the shaft eccentricity correction) are relocated in order of sample number to generate speed ratio data. Based on this data, thickness variance is calculated (S212). FIG. 18(*a*) shows a graph of the thickness variance thus obtained.

Incidentally, since the position of the core of the transfer belt 160 can be assumed not to steeply change, the data obtained by the thickness variance calculation is averaged as shown in FIG. 18(*b*) to generate data which represent more closely the behavior of the transfer belt 160 (S213). In this averaging, data is averaged in order to reduce an offset value due to a cumulative error which has been generated in operations. In one technique for this averaging, for example, in the case where one circle of a shaft corresponds to 780 pulses and the area of the transfer belt 160 passed over the shaft is ⅓, data for 260 pulses are averaged.

Subsequently, as shown in FIG. 18(*c*), in order to reduce processing load, the data is thinned in order to reduce the number of data elements, and then digitized (S214). Thus, a belt profile is generated (S215) and recorded (S105).

(Timing of Obtaining Belt Profile)

Incidentally, the belt profile data is generally obtained in advance at a time such as the time of shipment from a factory. In the present embodiment, the timing of re-obtaining belt profile data is controlled by a monitor section 320*a* of the profile generator 320 such as shown in FIGS. 19(*a*) to 21(*a*).

Figure 19:
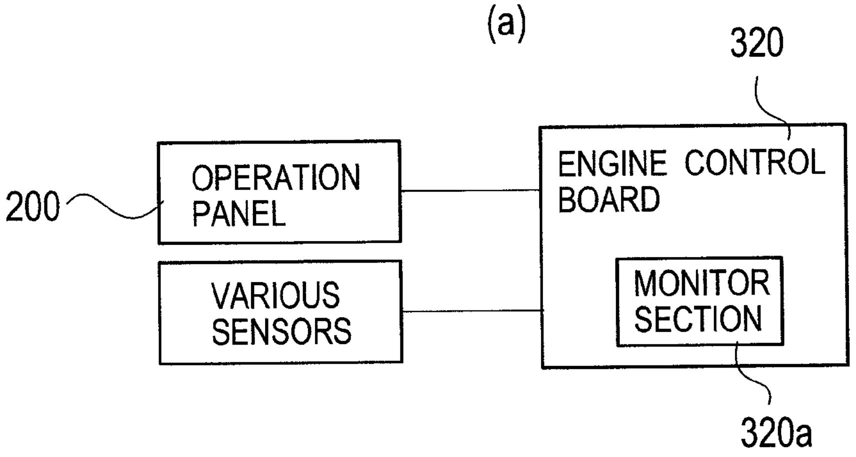
FIG. 19 is an explanatory diagram showing a configuration and a procedure for measuring the timing of obtaining the belt profile according to the embodiment.
Figure 19:
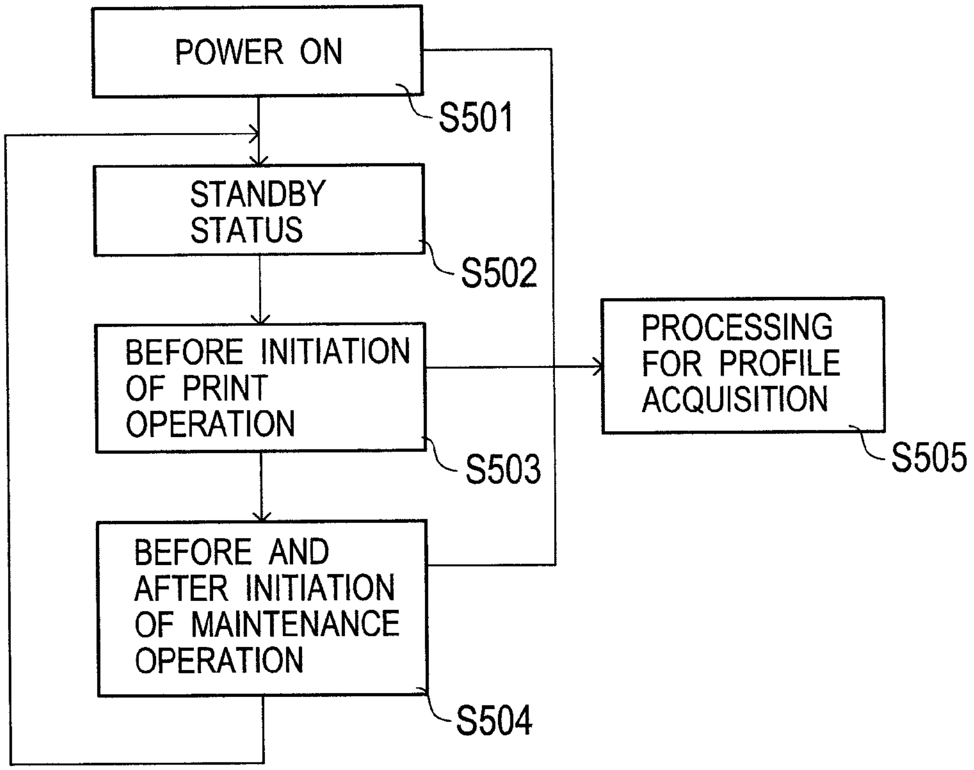

For example, as shown in FIG. 19(*a*), the monitor section 320*a* receives signals from the operation panel 200 and various sensors, and monitors changes in operations by a user and in the mode of the machine. As shown in FIG. 19(*b*), the execution of processing (S505) for obtaining a profile is triggered at the time of power-on (S501); the time before the initiation of a print operation (S503) after standby (S502); the time before or after the initiation of a maintenance operation (S504), such as the time of raising or lowering a platen or the time of opening or closing a cover; or the like.

The above-described invention preferably further includes a monitor section configured to monitor the length of the transfer belt 160, and the extractor preferably extracts speed data in the case where a change in the length of the transfer belt 160 has been detected. This makes it possible to obtain a belt profile again in the case where the transfer belt 160 has expanded or contracted due to a change over time or a change in temperature. Accordingly, this makes it possible to track a change of the transfer belt 160 over time or a change in temperature and thereby reliably prevent an ink misalignment.

Figure 20:
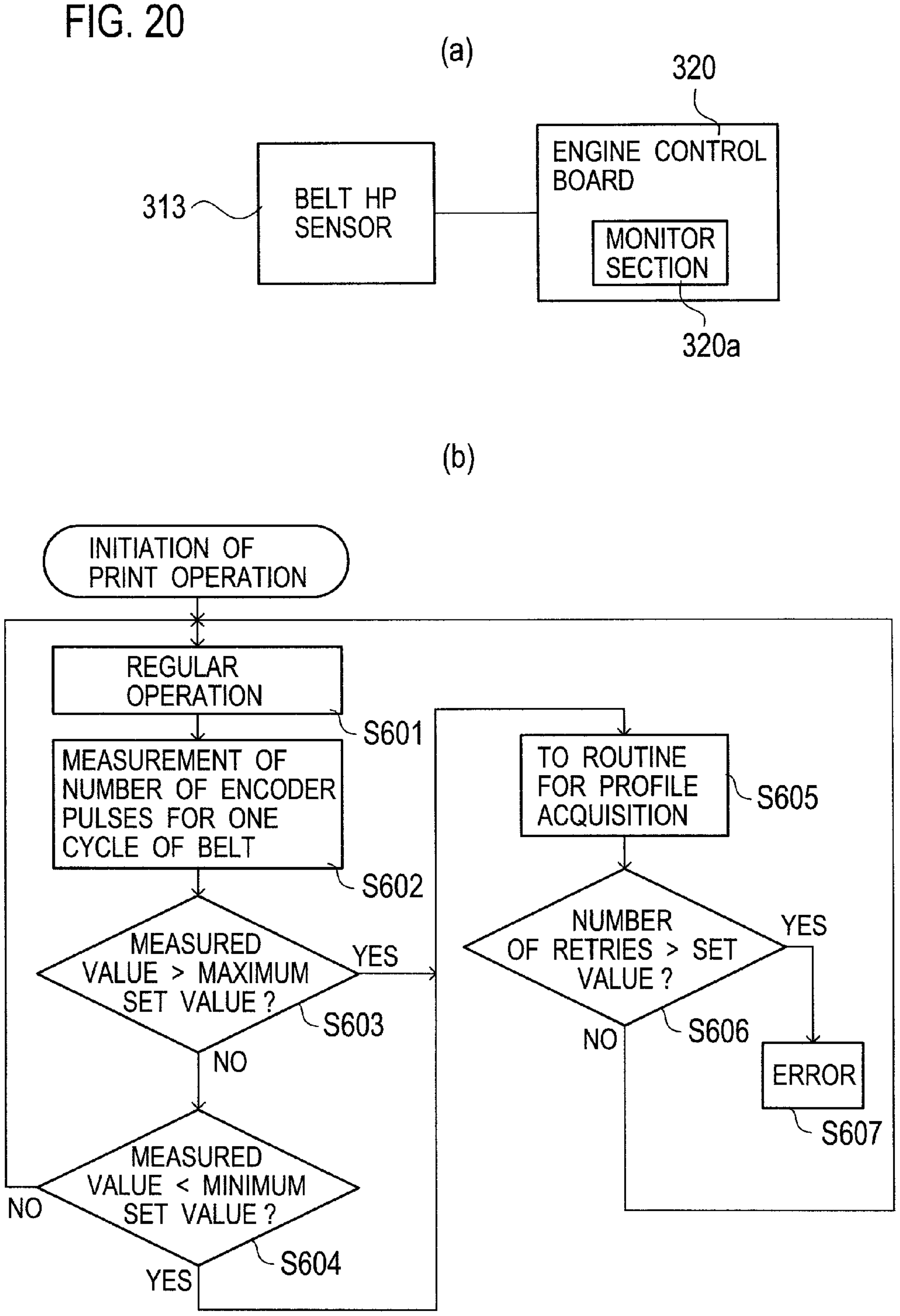
FIG. 20 is an explanatory diagram showing a configuration and a procedure for measuring the timing of obtaining the belt profile according to the embodiment.

Moreover, for example, as shown in FIG. 20(*a*), the monitor section 320*a* is configured to monitor the number of pulses from the belt HP sensor 313. As shown in FIG. 20(*b*), during normal operation (S601), the number of pulses from the belt HP sensor 313 is measured (S602), and the number of pulses for one belt cycle is compared with a maximum set value and a minimum set value (S603 and S604). When the number of pulses is out of a predetermined range ("Y" in step S603 or S604), it is determined that the transfer belt 160 has expanded or contracted due to a change over time or a change in temperature, and the aforementioned processing for obtaining a profile is executed (S605). It should be noted that this processing for obtaining a profile is repeated a number of times equal to a set value. If a re-try is performed a predetermined number of times or more, it is determined that a trouble has occurred ("Y" in step S606), and error processing is executed (S607).

Figure 21:
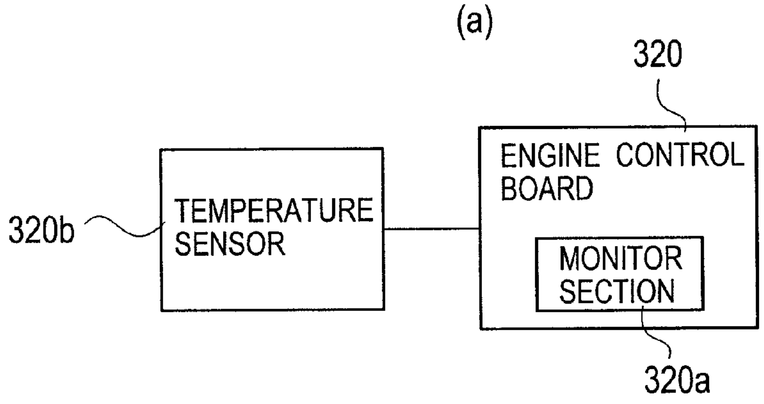
FIG. 21 is an explanatory diagram showing a configuration and a procedure for measuring the timing of obtaining the belt profile according to the embodiment.
Figure 21:
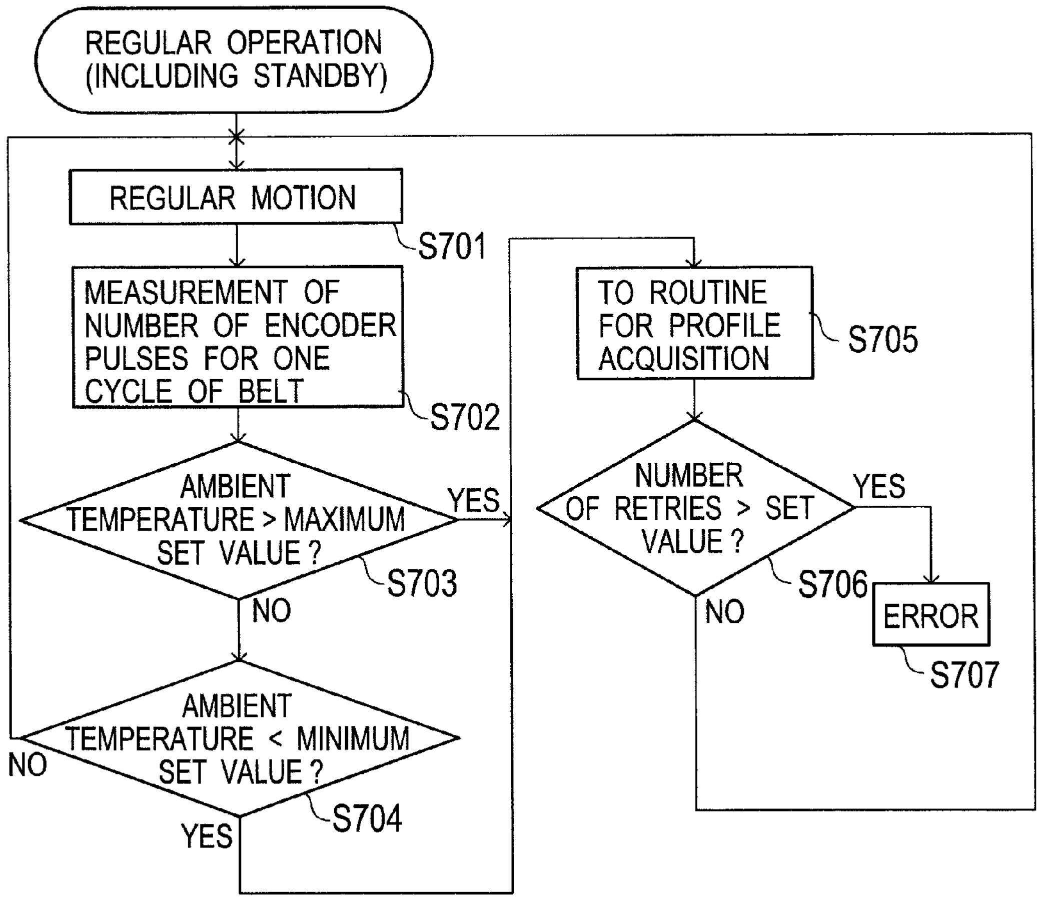

Furthermore, for example, as shown in FIG. 21(*a*), the monitor section 320*a* is configured to monitor the temperature measured by a temperature sensor 320*b*. As shown in FIG. 21(*b*), during normal operation (S701), the ambient temperature is measured using the temperature sensor (S702). If the ambient temperature is out of a predetermined range ("Y" in step S703 or S704), it is determined that the transfer belt 160 may expand or contract due to a change in temperature, and the aforementioned processing for obtaining a profile is executed (S705). It should be noted that this processing for obtaining a profile is also repeated a number of times equal to a set value. If a re-try is performed a predetermined number of times or more, it is determined that a trouble has occurred ("Y" in step S706), error processing is executed (S707).

(Modified Example)

In the above-described embodiment, it is configured that the distance D for use in the extraction of the phase inversion data is stored in advance as an actual measured value in a memory. However, when a belt profile is obtained again in the case where there occurs a change of the transfer belt 160 over time or a change in temperature as described above, the circumferential length of the transfer belt 160 changes; therefore, the value of the above-described distance D also changes. Accordingly, when a belt profile is re-obtained, the distance D is first recalculated in accordance with a procedure as described below, phase inversion data is then re-obtained, and the shaft eccentricity correction is performed using this phase inversion data.

Figure 22:
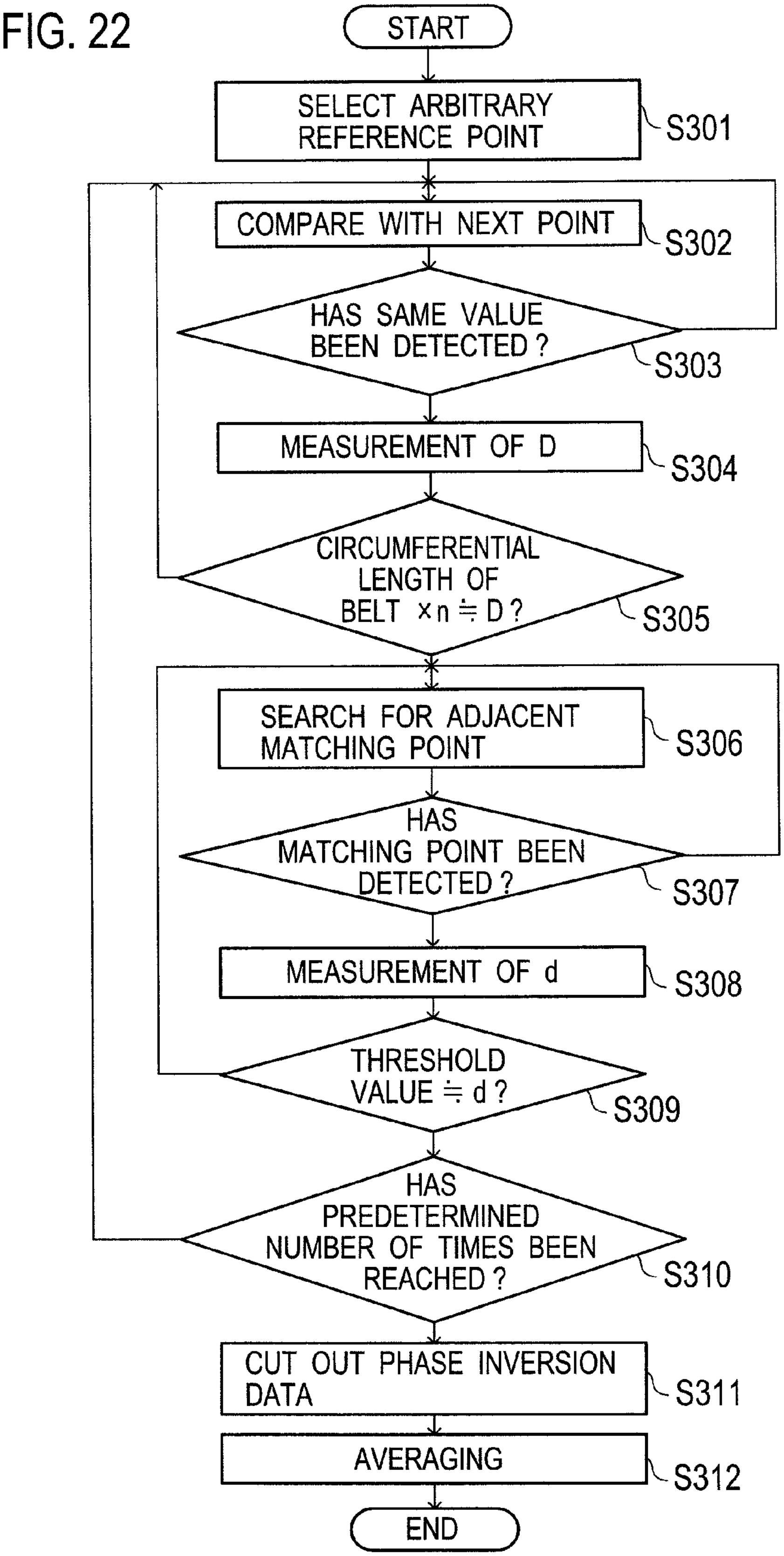
FIG. 22 is a flowchart showing a procedure for extracting phase inversion data according to a modified example.

Specifically, in the re-obtaining of phase inversion data, as shown in FIG. 22, first, an arbitrary reference point is selected (S301). This reference point may be an HP detected by, for example, an HP sensor. Subsequently, within the pulse width data stored in the encoder data memory 323, the speed at the above-described reference point is compared with the speed at the next point (S302) to detect a point (comparison point) having the same value (S303). Here, the comparison point may be searched for after a prediction is made to a certain extent that the comparison point will be a point which is the same point as the reference point on the transfer belt 160 but is a point, for example, such as one shifted from the reference point by a distance equal to an integral multiple of the belt length.

Figure 23:
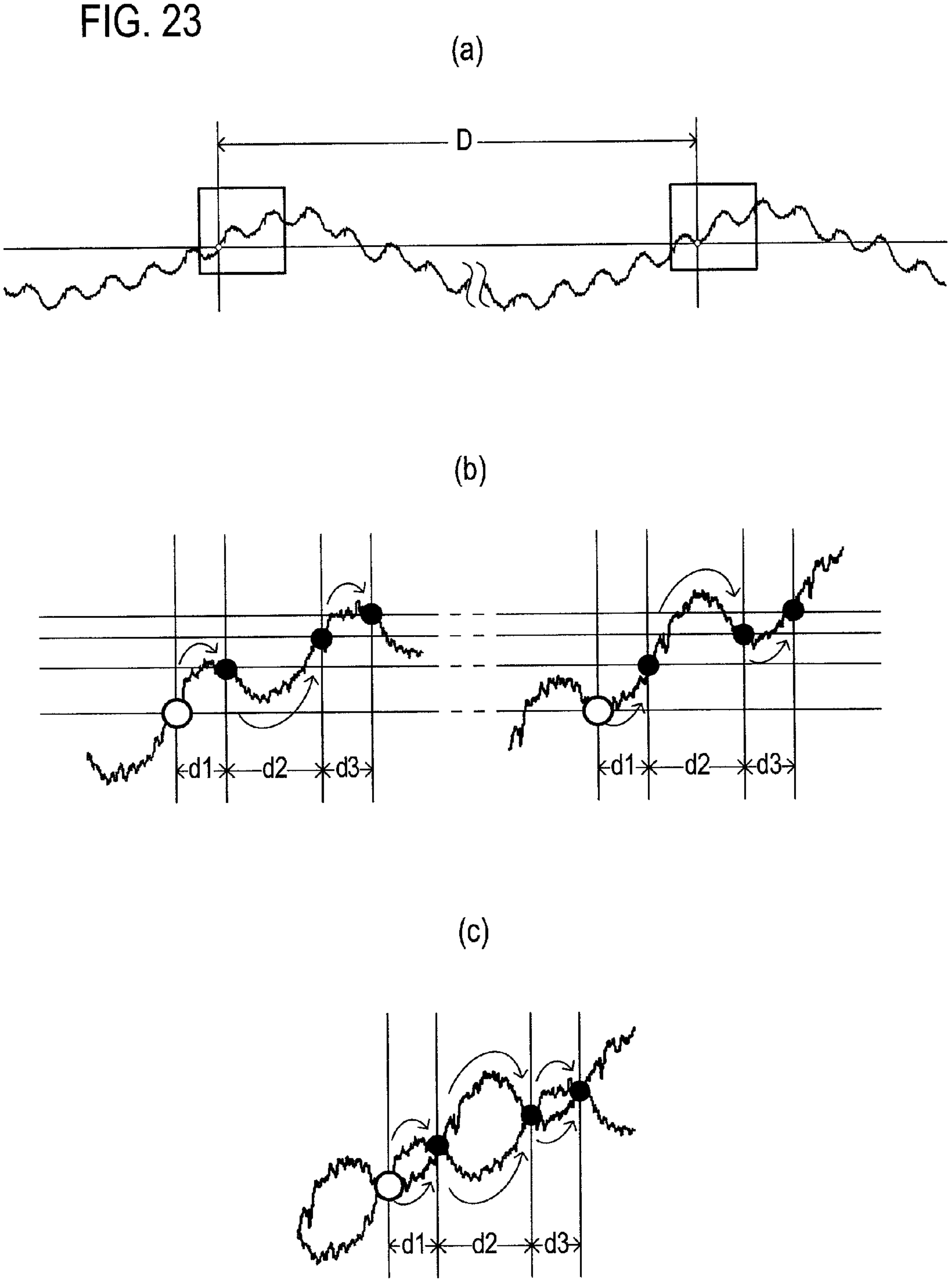
FIG. 23 is an explanatory diagram showing the procedure for extracting the phase inversion data according to the modified example.

Thereafter, if a comparison point having the same speed is detected in step S303, the phase inversion period D is measured (S304) which is the distance between the reference point and the comparison point as shown in FIG. 23(*a*). Then, a determination is made as to whether or not this distance D is approximately an integral multiple of the circumferential length of the belt (S305). If the distance D is not an integral multiple, the procedure returns to step S302 to continue to search for a comparison point.

On the other hand, if D is an integral multiple of the circumferential length of the belt in step S305, that point is set as a comparison point. Then, as shown in FIG. 23(*b*), the change in speed at the reference point is compared with the change in speed at the comparison point to detect points (matching points) which are respectively adjacent to the reference point and the comparison point and respectively have the same speed as them (S306 and S307).

Then, if the matching points are detected in step S307, an eccentricity period d (d1 to dn) is measured (S309) which is equal to the distances from the reference point and the comparison point to the respective matching points. The period d is compared with a threshold value. If the period d is within the range of the threshold value, a period d next to this is searched for (S310). This threshold value can be set for each encoder, and, for example, can also be set, based on the circumferential length of a shaft of the encoder, the belt thickness, or the like, as a periodic pattern in which multiple thresholds and the order of appearance thereof are defined. It should be noted that if d is out of the range of the threshold value in step S309, the procedure returns to step S306 to continue to search for a next matching point.

After that, if a predetermined number of matching points are successively detected as shown in FIG. 23(*c*), and a certain periodicity can be seen in the patterns (sizes of d1 to dn, the order of appearance, and the like) of the eccentricity periods (S310), the distance D is stored as a sliding amount. Using this distance D, phase inversion data is extracted (S311) as in the aforementioned embodiment. It should be noted that this eccentricity period pattern is experimentally found based on the phase inversion period D and the entire length of the transfer belt 160 to be stored as data for detection in the memory.

(Functions and Effects)

In the above-described printing machine according to the first embodiment, the ratio between the angular velocities of the drive roller and the driven roller is set as a parameter, and this parameter is used as belt profile data on the core member variance of the transfer belt 160. This makes it possible to take into consideration the influences of events, such as the undulation of the core members inside the transfer belt 160, which cannot be grasped from the surface of the transfer belt 160, and to reliably eliminate an ink misalignment.

Setting as a parameter the ratio between the angular velocities of the drive roller and the driven roller in the generation of this profile data enables an error ratio to be kept within a certain range and enables any speed to be covered by data on a single profile. As a result, even in a printing machine in which the travel speed of the belt varies in accordance with the resolution or the print mode, the present embodiment makes it possible to reduce the size of the profile data, to calculate the travel speed of the core member immediately below each ink head in an abbreviated manner, and thereby to avoid an increase in memory capacity and a delay in processing.

Moreover, in the present embodiment, the speed ratio between two arbitrary measurement points is accumulated starting from the reference point at intervals of the reference relative distance. Accordingly, the speed ratio with respect to the reference point can be found for the entire transfer belt 160, and a series of behaviors of the core portion which are associated with the rotations of the transfer belt 160 can be linearly handled in accordance with a certain criterion. Thus, elimination of an ink misalignment can be appropriately executed.

Further, in the present embodiment, averaging can be performed by extracting, from the travel speed data on the transfer belt 160, the phase inversion data in which the phase periodically inverts at a single point on the transfer belt 160 and by performing an operation, such as the subtraction of the phase inversion data from the speed data. Thus, an eccentricity component of the rollers which is superimposed on the speed data can be removed. Moreover, in the present embodiment, since the phase inversion data is extracted from the accumulated speed ratio data, it is not necessary to rotate the transfer belt 160 and measure the travel speed in order to obtain the phase inversion data again.

Moreover, in the present embodiment, the monitor section 320*a* monitors the operation panel 200 and various sensors. The belt profile can be obtained again in the case where there is a change in operations by a user or in the mode of the machine, a change of the transfer belt 160 over time, or a change in temperature. This makes it possible to track a change in environment or a change of the transfer belt 160 over time and thereby reliably prevent an ink misalignment.

[Second Embodiment]

Next, a second embodiment will be described. In the above-described first embodiment, the detecting part for detecting the respective angular velocities of the drive roller 161 and the driven roller 162 are used as a part for measuring a travel speed at two arbitrary measurement points. On the other hand, the gist of the present embodiment is that one of the detecting part for detecting the speed is a device configured to detect the travel speed of a transfer belt surface, and that speed ratio data includes a belt profile and a roller profile. It should be noted that in the present embodiment, the same components as those of the above-described first embodiment are denoted by the same reference signs, have the same functions and the like unless particularly mentioned, and will not be further described.

(Ejection Timing Control)

Figure 24:
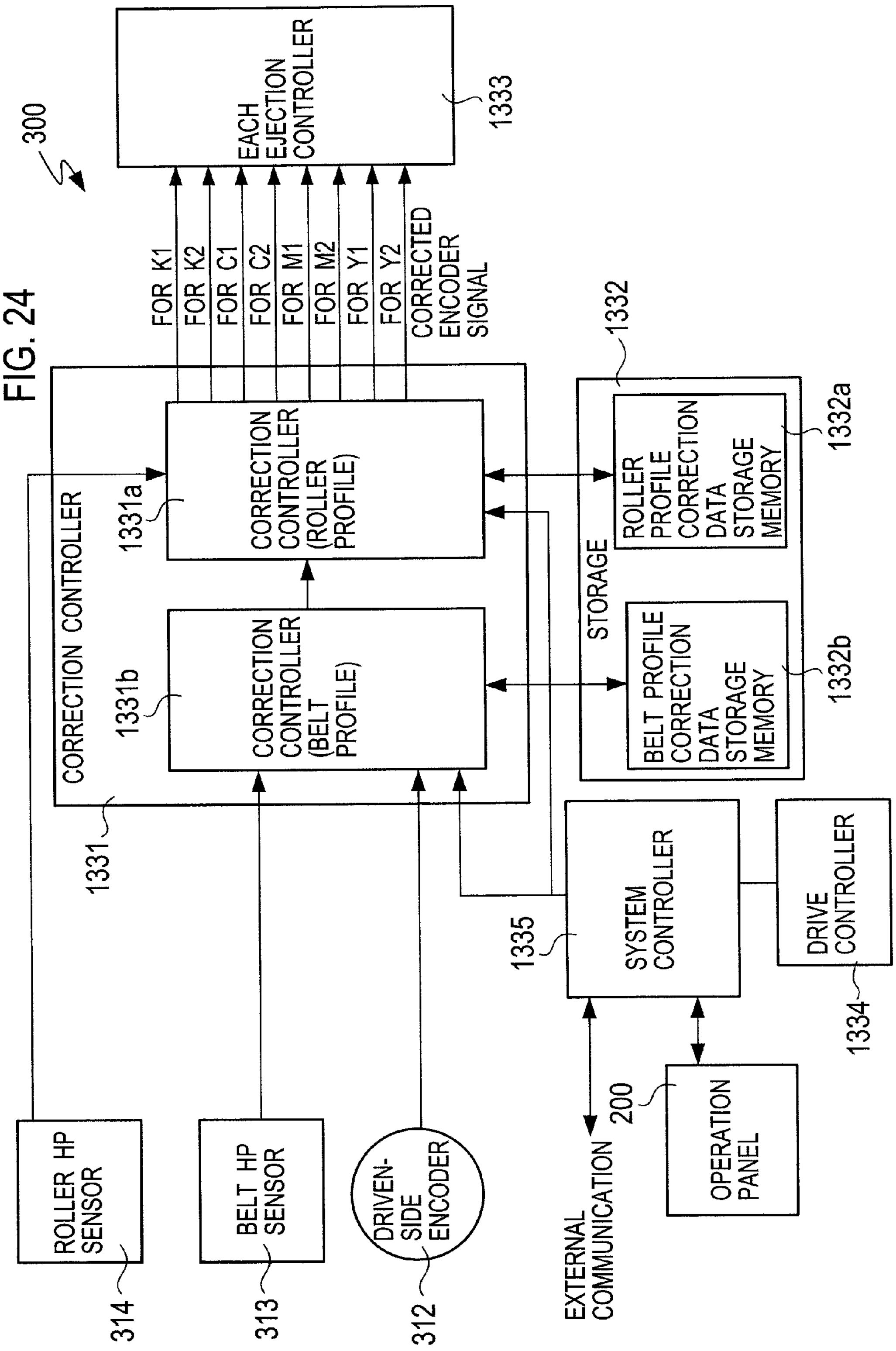
FIG. 24 is a functional block diagram showing modules relating to the ejection timing control in a head unit according to an embodiment.
Figure 25:
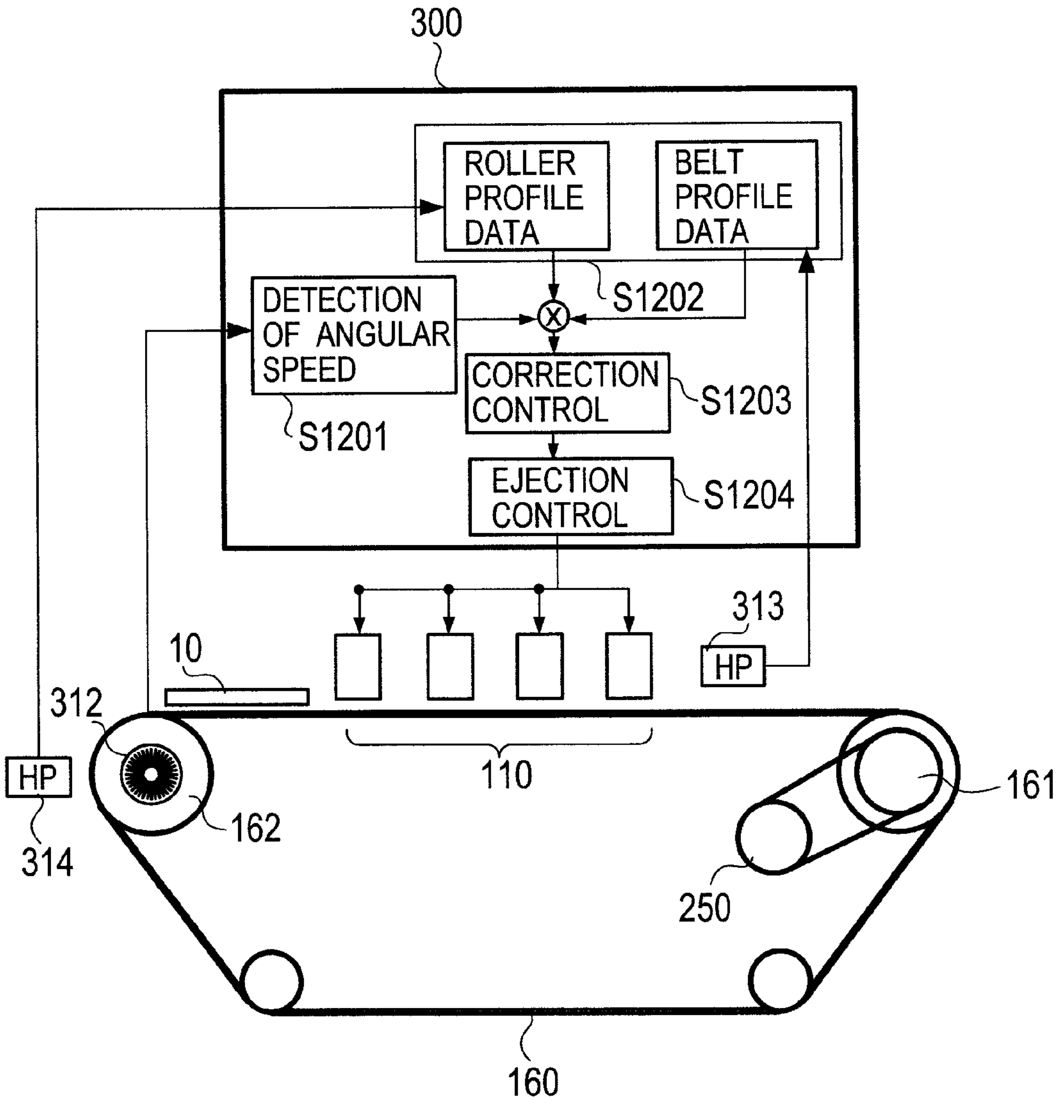
FIG. 25 is a functional block diagram showing the relationship between processing in an arithmetic processing unit and drive units for printing and transfer in a printing machine in the embodiment.

In the present embodiment, the above-described ejection timing control in the head unit 110 is performed by the aforementioned control unit 300 as well. FIG. 24 is a functional block diagram showing modules in the control unit 300 which relate to the ejection timing control in the head unit 110. FIG. 25 is a functional block diagram showing the relationship between processing in the control unit 300 and drive units for printing and transfer in the printing machine 100. It should be noted that the term "module" used in this description refers to a functional unit which is made of: hardware, such as devices and instruments; software having functions thereof; a combination of hardware and software; or the like, and the functional unit is intended to achieve predetermined operations.

As shown in FIG. 24, the control unit 300 according to the present embodiment includes: a correction controller 1331; a storage 1332; an ejection controller 1333; a drive controller 1334; and a system controller 1335, and is configured to transfer belt profile data and roller profile data from the storage 1332 to the correction controller 1331. The correction controller 1331 performs an encoder output correction.

The storage 1332 is a memory device configured to record generated belt profile data and roller profile data, and includes a storage memory 1332*b* configured to store the belt profile data and a storage memory 1332*a* configured to store the roller profile. It should be noted that, in the present embodiment, the belt profile data and the roller profile data are generated in advance by an external profile generating device 400 or the like, and are installed at the time of shipment from a factory or at the like time to be stored in the storage memory 1332*a* and 1332*b*, respectively.

The correction controller 1331 is a module configured to correct a detection signal inputted from the driven-side encoder 312 on the basis of the belt profile data and the roller profile data stored in the storage 1332 so that positional deviation among multiple images on the transfer belt 160 may be reduced, and configured to input the corrected signal to each ejection controller 1333.

In the present embodiment, the correction controller 1331 includes a belt profile correction control section 1331*a* and a roller profile correction control section 1331*b*. The belt profile correction control section 1331*a* is a module configured to correct the detection signal from the driven-side encoder 312 on the basis of the belt profile data, and corrects the speed variation caused by a thickness variation component of the belt. On the other hand, the roller profile correction control section 1331*b* is a module configured to correct the detection signal from the driven-side encoder 312 on the basis of the roller profile data, and mainly corrects the speed variation caused by an eccentricity component of the driven roller. It should be noted that, although in the present embodiment, the driven roller 162 is selected as an object of a roller profile in which an eccentricity component of a support roller is recorded, the eccentricity of, for example, an encoder or other support roller such as the drive roller 161 may also be selected as the object.

Moreover, the belt profile correction control section 1331*b* receives, in addition to the detection signal from the driven-side encoder 312, a belt home position signal sensed by the belt HP sensor 313 which is configured to sense one mark (reference mark) per one belt cycle. On the other hand, the roller profile correction control section 1331*a* receives the detection signal corrected by the belt profile correction control section 1331*b* and also receives a roller home position signal sensed by a roller HP sensor 314 which is configured to sense one rotation of the roller.

The ejection controller 1333 is a print controller for controlling, on the basis of this corrected detection signal, the timing at which each image is formed by the head unit 110. The head unit 110 forms multiple images on a record medium 10 under the control of this ejection controller 1333.

The system controller 1335 is a central processing unit configured to control the operation of each module in the control unit 300. The system controller 1335 controls image processing during printing and also controls the operation of each of the drive units in the transfer path through the drive controller 1334. Moreover, the system controller 1335 also functions as a communication interface configured to perform communications with the outside and as an interface configured to send and receive data to and from the operation panel 200.

(Method of Ejection Timing Control During Print Processing)

Thereafter, ejection timing control using the profile data generated as described above is performed by the following procedure. It should be noted that, here, the roller profile data and the belt profile data are assumed to be already stored as independent pieces of profile data in the storage memory 1332*a* and 1332*b* in the storage 1332, respectively.

First, before print processing is started, the roller profile data and the belt profile data thus stored are respectively read out of the storage memory 1332*a* and 1332*b* to be inputted to the correction controller 1331.

Subsequently, after print processing has been started, an angular speed detected by the driven-side encoder 312 is inputted to measure the travel speed of the transfer belt (S1201). Based on a result of the measurement, the ejection control of the head unit 110 is performed. At the time of this ejection control, the correction controller 1331 corrects the encoder detection signal inputted from the driven-side encoder 312 on the basis of the roller profile data and the belt profile data stored in the storage 1332 so that positional deviation among multiple images on the transfer belt 160 may be reduced (S1202 and S1203), and inputs the corrected signal to the ejection controller 1333.

In this correction, a correction value in the belt profile data is read out in accordance with the rotation period of the transfer belt 160 on the basis of the home position signal. Then, the encoder detection signal inputted from the driven-side encoder 312 is advanced or delayed in accordance with the correction value as shown in FIG. 8 to be adjusted so that positional deviation (ink misalignment) among multiple images on the transfer belt 160 may be reduced, and is then inputted to the ejection controller 1333. The ejection controller 1333 controls based on the above-described corrected encoder detection signal the timing at which each image is formed by the head unit 110 (S1204). The head unit 110 ejects inks under the control of this ejection controller 1333 to form multiple images on a record medium.

It should be noted that, in the present embodiment, in order to eliminate an ink misalignment, it is necessary to calculate an absolute positional deviation with respect to an appropriate landing position such as indicated by Ad in FIG. 8. However, measurement values at two measurement points on the belt at each moment are the relative speed variation between these two measurement points. Accordingly, in an ink misalignment correction, it is necessary to calculate an absolute speed variation with respect to a predetermined reference point. In the present embodiment, it is configured that the speed ratio between two measurement points at each time point is accumulated, and Δd, which is an absolute positional deviation at each time point, is held as a profile in advance.

(Profile Generating Device)

Figure 26:
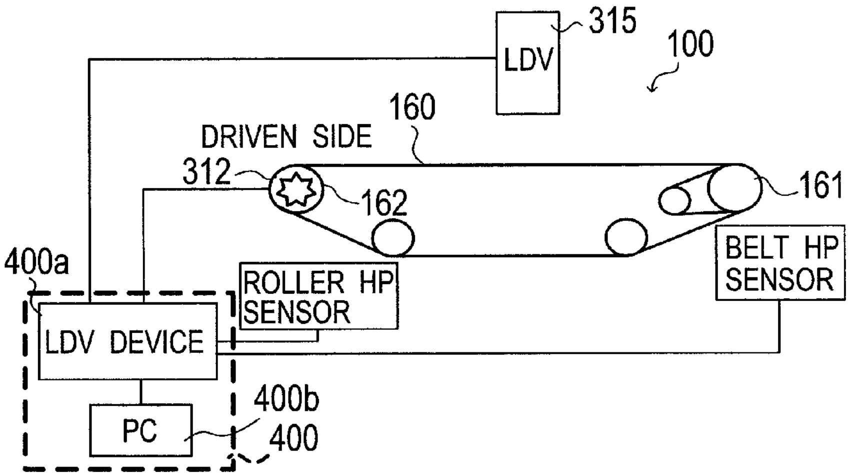
FIG. 26 is a functional block diagram showing modules relating to profile generation according to the embodiment.
Figure 26:
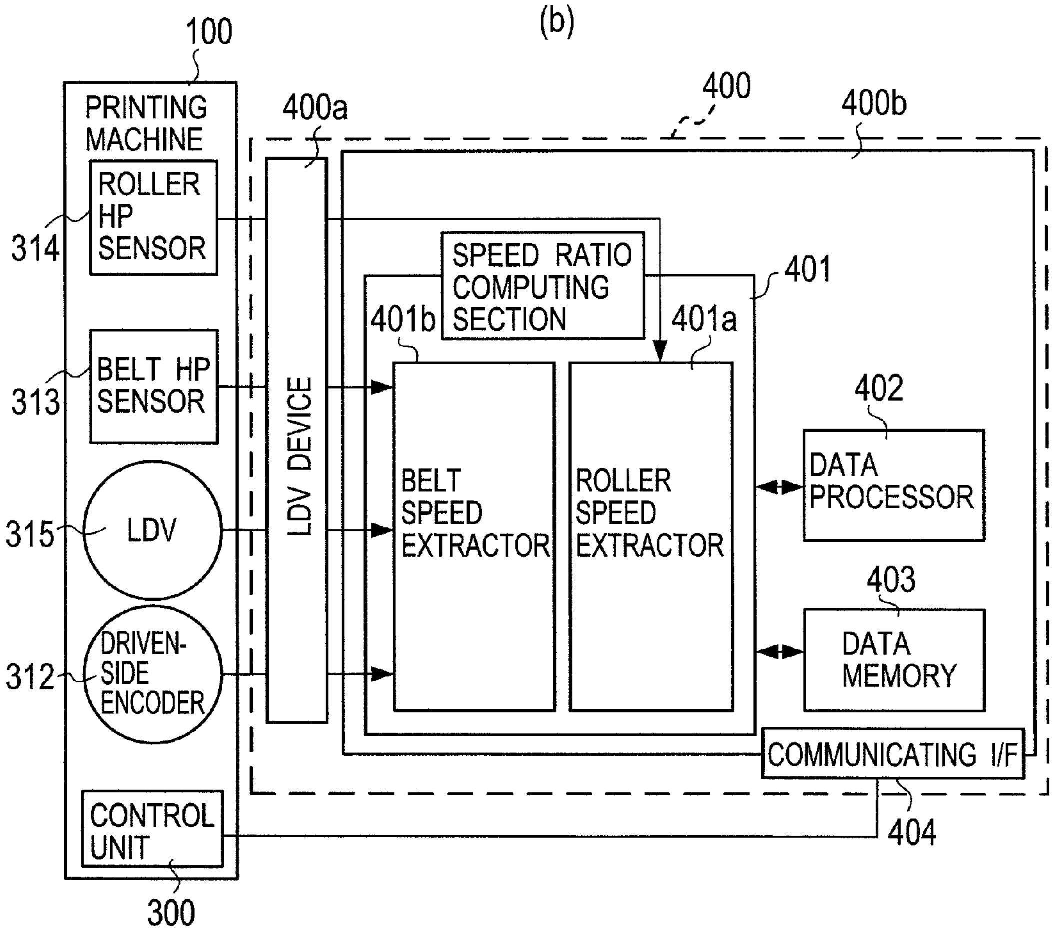

In the present embodiment, the belt profile data and the roller profile data described above are generated using the profile generating device 400 to be installed in the storage 1332. FIG. 26 is an explanatory diagram schematically showing the configuration of the profile generating device 400. As shown in FIG. 26(*a*), the profile generating device 400 is an external device which is temporarily connected to the printing machine 100 at a time during the fabrication of the printing machine 100, a time before shipment from a factory, the time of maintenance, or the like, and principally includes an LDV device 400*a* and a PC 400*b*.

The LDV device 400*a* is a device configured to measure the travel speed of an object in a noncontact manner using a laser Doppler velocimeter 315 which serves as a speed measuring part, and has the following sensors connected thereto: the laser Doppler velocimeter 315 attached to the upper surface of the transfer belt 160, the driven-side encoder 312 provided on the driven roller 162, the belt HP sensor 313 configured to detect one cycle of the transfer belt 160, and the roller HP sensor 314 configured to detect one rotation of the driven roller 162. The LDV device 400*a* obtains signals inputted from these sensors, and passes the signals to the PC 400*b* which serves as a profile generating device while bringing the signals into synchronization with each other.

The PC 400*b* is an arithmetic processing device including a CPU, and can be implemented with a general-purpose computer, such as a personal computer, or a functionally-specialized dedicated device. The PC 400*b* functions as a profile data generating device by executing software on the CPU. Specifically, as shown in FIG. 26(*b*), the PC 400*b* which serves as a profile data generating device includes a speed ratio computing section 401, a data processor 402, and data memory 403.

The speed ratio computing section 401 is a module configured to calculate the temporal variation in speed ratios at each measurement point using a belt speed extractor 401*b* and a roller speed extractor 401*a*. Specifically, the belt speed extractor 401*b* and the roller speed extractor 401*a* measure the travel speed at two arbitrary measurement points set on the transfer belt 160 or its driving part (drive motor, support roller, or the like) by using the speed measuring part. In the present embodiment, these two arbitrary measurement points are respectively referred to as a first measurement point and a second measurement point. The travel speed at the first measurement point is the travel speed of the transfer belt surface immediately below the central portion of the ink head, and the second measurement point is the speed of rotation (angular speed) of the driven roller 162.

Moreover, in the present embodiment, the speed measuring part for the first measurement point is a noncontact measuring device configured to optically measure the travel speed of the transfer belt surface. In the present embodiment, the laser Doppler velocimeter 315 is used as the speed measuring part for the first measurement point. The laser Doppler velocimeter 315 is the speed measuring part for optically measuring the travel speed of the transfer belt 160 surface. Specifically, the laser Doppler velocimeter 315 measures a change in wavelength between an incident light and a reflected light on the basis of the relative speed thereof with respect to an object, thus measuring the speed of the object. It should be noted that the laser Doppler velocimeter 315 is attachably and detachably provided to the printing machine 100. Thus, the laser Doppler velocimeter 315 can be installed only when profile data is created, and an expensive measuring device does not need to be incorporated in the image forming apparatus. Accordingly, the fabrication cost can be reduced.

On the other hand, the speed measuring part for the second measurement point is the driven-side encoder 312 configured to measure the rotational speed of the driven roller 162. The belt speed extractor 401*b* and the roller speed extractor 401*a* extract speed data of the transfer belt and the roller from the travel speed measured by the laser Doppler velocimeter 315 and the detection signal of the driven-side encoder 312, respectively. Here, in the present embodiment, the second measurement point is the rotational speed of the driven roller 162 to reduce a difference between the behavior of the belt and the measurement result by the encoder due to the influence of the driving force of a motor or the like, which is configured to rotate the drive roller 161, for example, speed variance or the like caused by factors such as slip between the driving force and the belt. It should be noted that the present invention is not limited to this. The rotational speed of the drive roller 161 may be measured at the second measurement point, and a drive-side encoder may be used as a unit configured to measure the rotational speed of the drive roller 161.

Further, in the present embodiment, as shown in FIG. 26(*b*), a detection signal from the laser Doppler velocimeter 315 and the detection signal from the driven-side encoder 312 are inputted to the speed ratio computing section 401. Moreover, the speed ratio computing section 401 receives home position signals respectively sensed by the belt HP sensor 313 configured to sense one mark (reference mark) per one belt cycle and the roller HP sensor 314 configured to sense one mark (reference mark) per one rotation of the roller.

The data processor 402 is a module configured to perform processing, such as averaging and digitization, on speed ratio data. The data memory 403 is a memory device configured to record, as speed data, pulse width data measured by the laser Doppler velocimeter 315 and the detection signal from the driven-side encoder 312.

Further, the speed ratio computing section 401 calculates the temporal variation in the speed ratio at each measurement point on the basis of the travel speed of the transfer belt surface detected by the laser Doppler velocimeter 315 and the angular speed detected by the driven-side encoder 312, and extracts the belt profile data and the roller profile data on the basis of frequencies corresponding to the calculated speed ratios.

These pieces of profile data are sent out from the data processor 402 through a data bus to the data memory 403. The data memory 403 is a storage configured to store the belt profile data and the roller profile data, and the belt profile data and the roller profile data stored therein are sent to the printing machine 100 through a communication interface 404 and the like.

Figure 27:
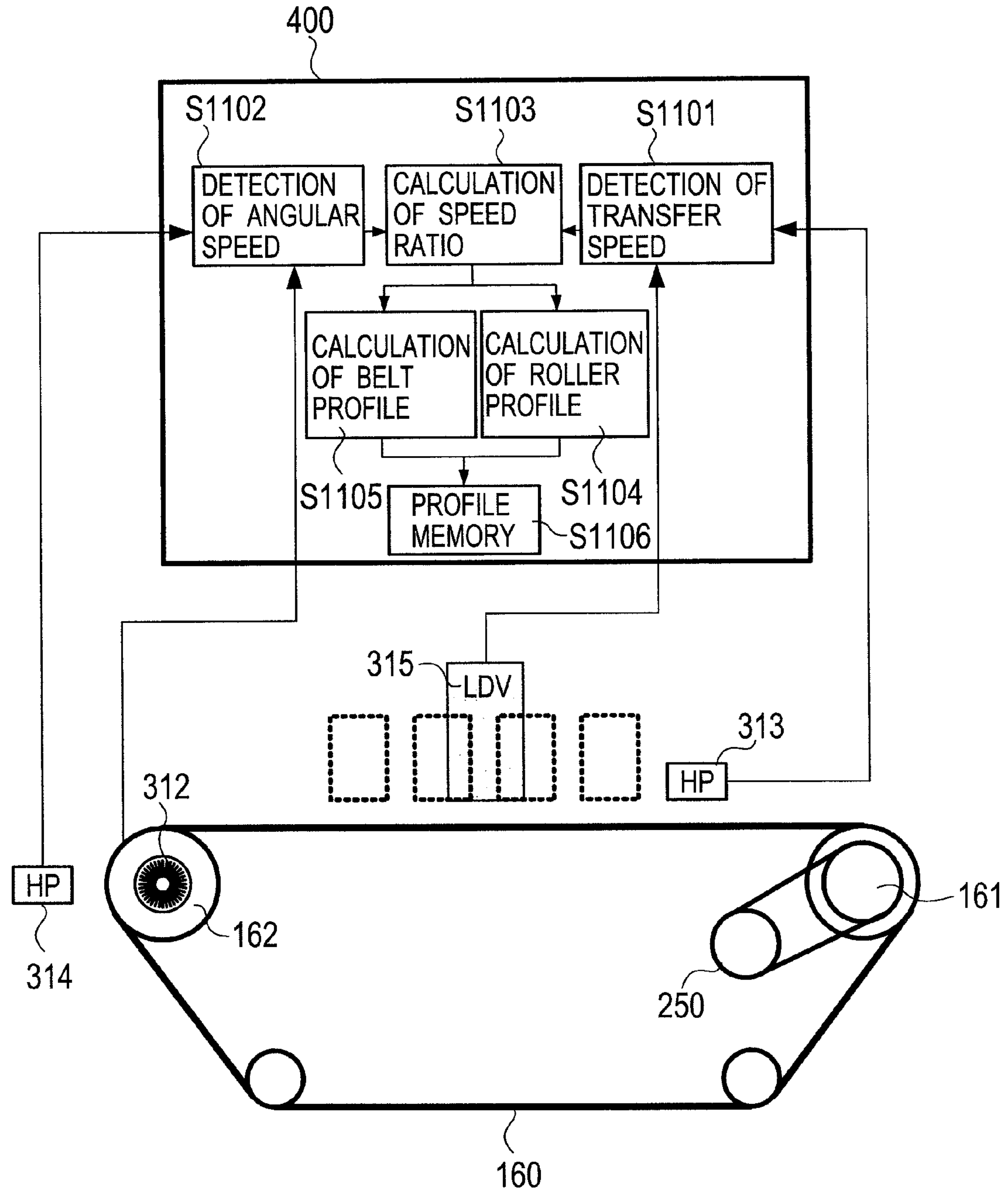
FIG. 27 is an explanatory diagram schematically showing functions and operations for profile generation according to the embodiment.

The operation of the profile generating device 400 having the above-described configuration during processing for generating the belt profile data and the roller profile data will be described in detail. FIG. 27 is a block diagram schematically showing an operation procedure for generating a belt profile.

First, the temporal variation in the speed ratio at each measurement point is calculated using the belt speed extractor 401*b* and the roller speed extractor 401*a*. Specifically, the belt speed extractor 401*b* and the roller speed extractor 401*a* measure the travel speeds at two arbitrary measurement points on the belt using the speed measuring part (S1101 and S1102). In particular, the travel speed at the first measurement point is obtained by measuring a change in wavelength between an incident light and a reflected light with respect to the surface of the transfer belt 160 as an object using the laser Doppler velocimeter 315, and the speed at the second measurement point is obtained by measuring the rotational speed of the driven roller 162.

The speed ratio computing section 401 calculates speed ratios based on the belt travel speed optically measured by the laser Doppler velocimeter 315 with respect to the rotational speed of the driven-side encoder 312 and the angular speed from the laser Doppler velocimeter 315 (S1103), and records the temporal change of these speed ratios, thus turning the temporal variation in the travel speed into a profile (S1105 and S1104).

Here, the temporal variation in the travel speed includes the speed variation due to thickness variance over the entire loop of the transfer belt and the eccentricity of the support roller. The belt speed extractor 401*b* extracts the belt profile data having a frequency corresponding to the travel speed of the transfer belt from the temporal variation in these travel speeds, and the roller speed extractor 401*a* extracts the roller profile data having a frequency corresponding to the rotational speed of the support roller from the temporal variation in the travel speed at each measurement point. In the present embodiment, data on the speed ratio is recorded as data for one belt cycle.

It should be noted that in the present embodiment, the timing of obtaining the belt profile data and the roller profile data is the time of shipment from a factory. However, the timing of obtaining the data is not limited to the time of shipment from a factory, but the trigger may be the time of an environmental change, the time of a change over time, the time of maintenance, or the like.

(Operation at the Time of Generating Profile)

Figure 28:
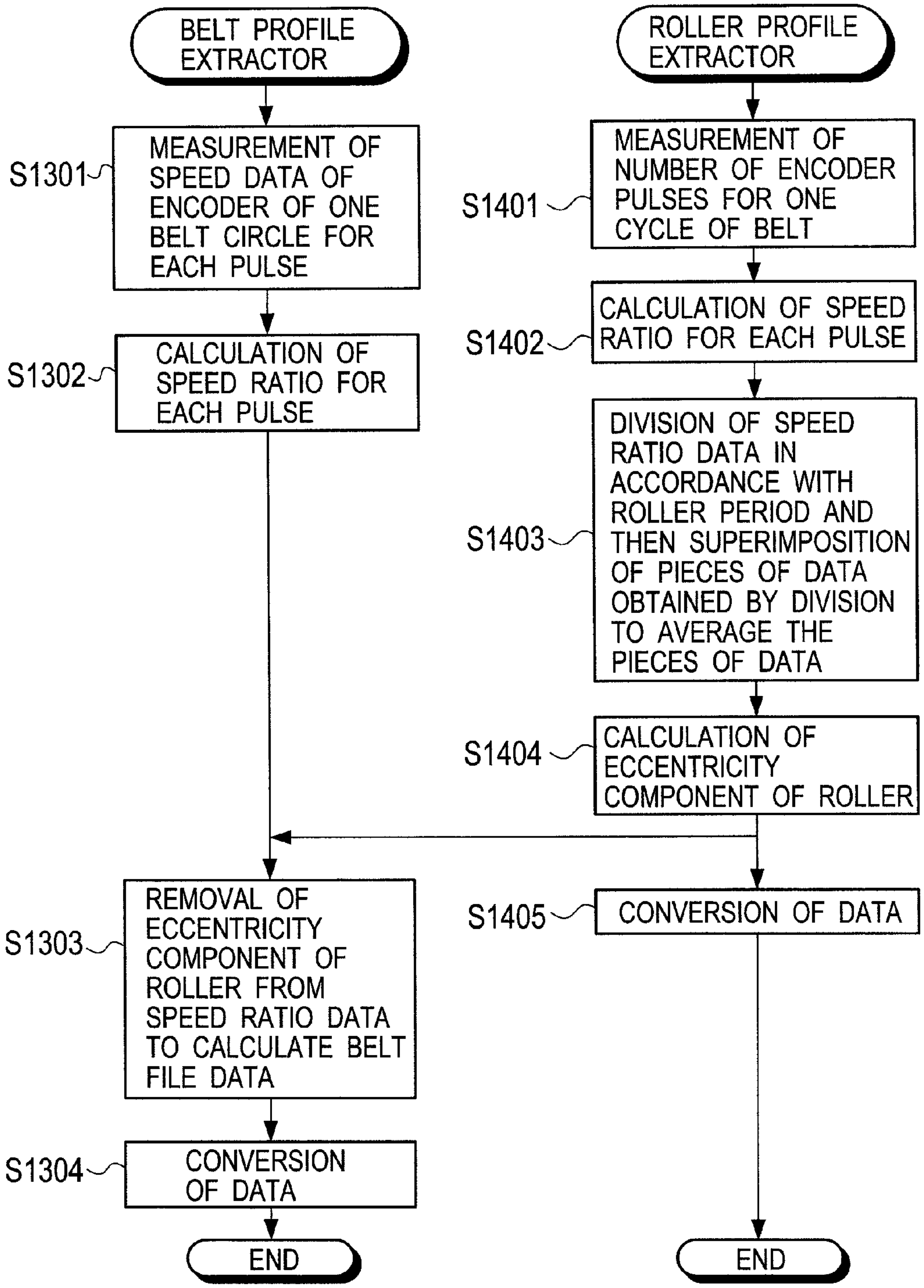
FIG. 28 is a flowchart showing a procedure for generating profile data according to the embodiment.

A description will be made of the operation of the profile generating device 400 according to the present embodiment, which has the above-described configuration, at the time of generating a profile. FIG. 28 is a flowchart showing operation at the time of generating a profile.

First, the profile generating device 400 detects signals from each of the sensors and the encoder. Specifically, the detection signal from the laser Doppler velocimeter 315 and the detection signal from the driven-side encoder 312 are inputted to the speed ratio computing section 401. Moreover, the home position signals sensed by the belt HP sensor 313 and the roller HP sensor 314 are inputted to the speed ratio computing section 401. Based on these, the travel speed is measured for each encoder pulse for one belt cycle (S1301 and S1401).

Subsequently, the speed ratio computing section 401 extracts speed ratio data on the travel speed which has a frequency corresponding to the speed variation of the transfer belt 160, from the ratio between the travel speed and the angular speed respectively detected by the laser Doppler velocimeter 315 and the driven-side encoder 312 (S1302 and S1402).

Then, the roller speed extractor 401*a* extracts the roller profile data from the temporal variation in the travel speed at each measurement point on the basis of a frequency corresponding to the rotation period of the support roller. Meanwhile, the belt speed extractor 401*b* calculates a frequency corresponding to the rotation period of the driven roller 162 as an eccentricity component of the driven roller 162, and removing the eccentricity component of the support roller from a frequency corresponding to the travel speed of the transfer belt to extract the belt profile data.

Specifically, the roller speed extractor 401*a* divides data on the calculated variable speed ratio for each pulse into pieces of periodic data for one revolution of the driven roller, and averages the pieces of periodic data for one belt cycle (S1403). Thus, an eccentricity component of the roller is calculated (S1404). Then, the data processor 402 performs data processing on this eccentricity component of the roller to generate the roller profile data (S1405).

Similar to the above, the belt speed extractor 401*b* calculates speed ratio data on travel speeds which has a frequency corresponding to the speed variation of the transfer belt 160 (S1301 and S1302). After that, the previously calculated eccentricity component of the roller is removed from a frequency corresponding to the speed ratio data, and a component due to the thickness variance of this belt is calculated (S1303). Then, the data processor 402 performs data processing on the component due to the thickness variance of this belt to generate the belt profile data (S1304).

The roller profile data and the belt profile data thus calculated are sent out from the data processor 402 through the data bus to the data memory 403. The data memory 403 stores the received belt profile data. As described above, the roller profile data and the belt profile data are stored as independent pieces of profile data in the data memory 403, respectively.

(Accumulation of Profile Data)

Figure 29:
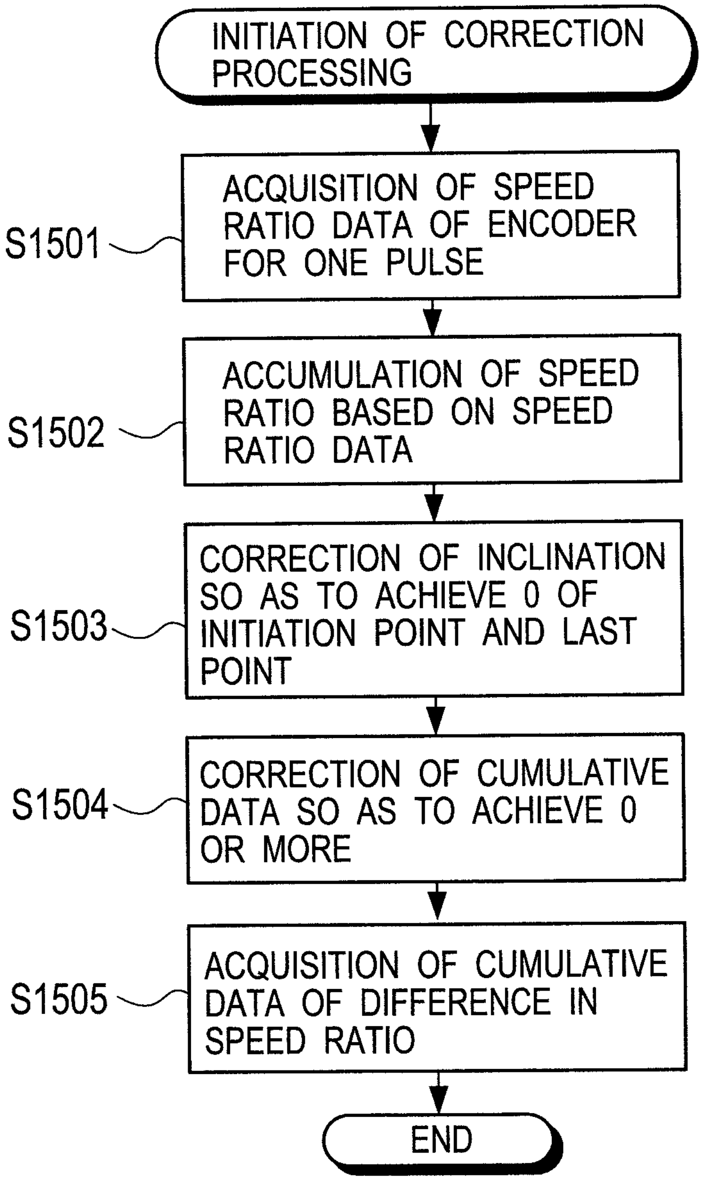
FIG. 29 is a flowchart showing a procedure for correcting speed ratio cumulative data according to the embodiment.

In the present embodiment, cumulative data is calculated as well in the aforementioned speed ratio calculation in steps S1302 and S1402. FIG. 29 is a flowchart showing a procedure for generating profile cumulative data.

First, in the calculation of the cumulative data, an arbitrary point, such as an HP, is set as a reference point, and speed ratio data is obtained per one encoder pulse (S1501) to find the speed ratio with respect to this reference point over the entire loop of the transfer belt 160. The respective values of the speed ratio are subjected to cumulative calculation one after another (S1502).

Specifically, the angular speed of the drive-side encoder 310 at the rotation angle at an arbitrary time (t) is defined as ωt. The speed of the belt surface at cot at the measurement point for the LDV 315 is denoted by Vt. The speed ratio of one measurement point of these two measurement points to the other measurement point is referred to as a relative speed ratio Vt/ωt.

To be more specific, the speed of the belt surface at the measurement point for the LDV 315 at a certain moment is defined as a reference speed VA, and the travel speed of the transfer belt 160 rotated around by the drive-side encoder 310 at that time is denoted by VB. Moreover, the belt travel speed VB at the driven-side encoder 310 at the arbitrary time (t) is VB=ωt×Rt, where the radius of rotation at that time is denoted by Rt. The change of Rt is the temporal change of belt thickness variance at the driven-side encoder 310, and obtained as VB/ωt=Rt. Here, if the expansion and contraction of the transfer belt 160 is neglected, VA=VB. Since the belt surface measured by the LDV 315 at the arbitrary time (t) is at the speed Vt, VA=VB=Vt. Thus, the relationship Vt/ωt=Rt is obtained. Accordingly, retaining the thickness variance Rt at an arbitrary time as a profile makes it possible to correct VA at that moment on the basis of ωt and thereby eliminate an ink misalignment.

Further, as shown in the table below, with the speed ratio at a reference point (for example, a home position at t=0) on the transfer belt 160 referred to as a reference speed ratio V0/ω0=R0, the speed ratios Rt at respective times are multiplied one after another in the circumferential direction of the transfer belt 160 to be accumulated, and the speed ratio Ct at each point with respect to the reference point is calculated over the entire loop of the transfer belt 160.

TABLE 4

| Sample | Measurement points | Ratio (%) | Accumulation (%) |
|---|---|---|---|
| 0 | V0/ω0 | R0 | C0 = 1.0 × R0 |
| 1 | V1/ω1 | R1 | C1 = C0 × R1 |
| 2 | V2/ω2 | R2 | C2 = C1 × R2 |
| 3 | V3/ω3 | R3 | C3 = C2 × R3 |
| 4 | V4/ω4 | R4 | C4 = C3 × R4 |
| . | . | . | . |
| . | . | . | . |
| . | . | . | . |
| N | Vn/ωn | Rn | C2 = Cn − n |

Figure 30:
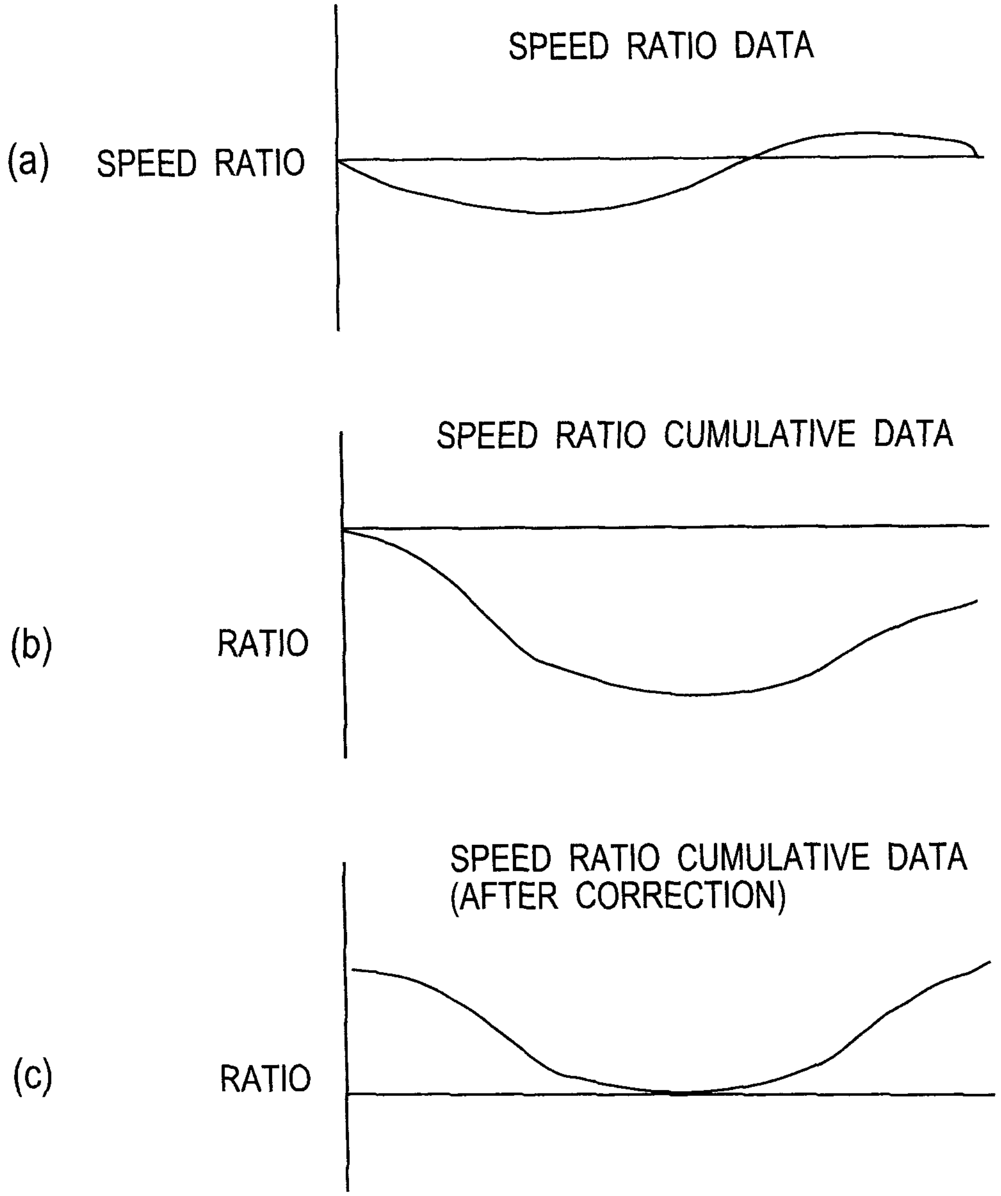
FIG. 30 is a graph showing the calculation of cumulative data for a difference in speed ratio according to the embodiment.

It should be noted that after the cumulative data of the speed ratio is calculated as described above, various kinds of data processing, such as a zero correction, is then performed on this cumulative data. FIG. 30 is a graph showing the accumulated speed ratio. Here, in FIG. 30, the X axis represents a position for one belt cycle with an arbitrary correction reference point set as a zero point, and the Y axis represents a value of the speed ratio at the reference point and has a ratio value of 1 at the intersection (origin) thereof with the X axis. It should be noted that FIG. 30(*a*) is obtained by plotting ratios (R0, R1, R2, Rn) at the respective measurement points in Table 1, and FIG. 30(*b*) is obtained by plotting cumulative values (C0, C1, C2, Cn) corresponding to the respective plots in FIG. 30(*a*). Further, FIG. 30(*c*) is obtained by performing a correction such that the whole plotted line in FIG. 30(*b*) can be on or above zero.

In the zero correction in step S1503, first, regarding the speed ratio at each point such as shown in FIG. 30(*a*), using as a reference an arbitrary measurement point on the transfer belt or its driving part, speed ratios (R1, R2, Rn) at respective moments are sequentially multiplied by a speed ratio of 1 (=R0) to be accumulated. Then, as shown in FIG. 30(*b*), cumulative data of the speed ratio is calculated.

In the case where there is negative data in the cumulative data thus calculated, in order to perform a correction with a reference set at a maximum value which causes a delay in a speed variation, data is corrected such that all data values become zero or more as shown in FIG. 30(*c*) (S1503). By performing the data processing as described above, the cumulative data of the speed ratio is turned into the belt profile data (S1504).

The cumulative data of the speed ratio contained in the belt profile data thus calculated is stored in the storage 1332 of the printing machine 100 at the time of shipment to be used as a belt profile at the time of printing.

(Functions and Effects)

In the above-described printing machine 100 according to the present embodiment, when print processing is performed, the travel speed at any one of two arbitrary measurement points is measured, and a result of the measurement is extracted and stored as the belt profile data and the roller profile data in advance. Based on the belt profile data and the roller profile data, the timings at which images are formed by the respective ink heads are controlled. In this way, print timings are changed so that print positional deviation due to the variation in the transfer belt speed may not occur. Thus, an ink misalignment can be eliminated.

Further, in the present embodiment, cumulative data obtained by accumulating the speed ratio variation is used. Accordingly, the speed ratio with respect to the reference point can be found for the entire belt, and a series of behaviors associated with the rotation of the belt can be handled as an absolute amount of change with the reference point as the origin such as shown in FIG. 30(*c*). Thus, the arithmetic processing can be simplified. To be more specific, in order to eliminate an ink misalignment, it is necessary to calculate an absolute positional deviation with respect to an appropriate landing position such as indicated by Δd in FIG. 8. However, measurement values at two respective measurement points on the belt at each moment represent a relative speed variation between these two measurement points. Accordingly, when an ink misalignment is corrected, it is necessary to calculate an absolute speed variation with respect to a predetermined reference point. In the present embodiment, the speed ratio between two measurement points is accumulated, and Δd at each point in time is retained as a profile in advance. Accordingly, arithmetic processing load during print execution can be reduced.

Furthermore, in the present embodiment, the speed ratio variation is accumulated to be handled as cumulative data. Thus, the speed ratio with respect to the reference point can be found for each point on the belt. This makes it possible to instantaneously grasp the maximum amount of deviation accumulated for the entire belt. This maximum amount cannot be estimated from data obtained by calculating the speed ratio at each moment at each point on the belt in real time.

Specifically, since the belt profile data is cumulative data, the speed ratio at each point on the belt can be obtained as a sine curve with the origin thereof at the reference point as shown in FIG. 30(*c*). Then, by finding the maximum amplitude of this sine curve, the maximum amount of deviation accumulated for the entire belt can be instantaneously grasped. As a result, any product in which the maximum amount of the deviation exceeds a tolerance level can be easily and quickly identified in, for example, an inspection at the time of shipment from a factory.

Moreover, in the present embodiment, as data for the correction, the belt profile data and the roller profile data are stored and used as separate pieces of file data. Accordingly, for example, in such a case where only the transfer belt is to be changed, only the belt profile data can be newly created to be installed in the printing machine 100. This can be performed only by work and operation at the site where the printing machine 100 is installed. Thus, the maintenance work can be facilitated.

Furthermore, in the present embodiment, the belt speed extractor 401*b* and the roller speed extractor 401*a* calculate the temporal variation in the speed ratio at each measurement point, and extract the belt profile data and the roller profile data, respectively, on the basis of a frequency corresponding to the calculated speed ratio. Accordingly, setting as a parameter the speed ratio between two measurement points in the generation of the profiles enables an error ratio to be kept within a certain range and enables any speed to be covered by each of the profiles alone. Thus, even in a printing machine in which the travel speed of the belt varies in accordance with the resolution and the print mode, it is possible to reduce the size of the profile data, to calculate the travel speed of the transfer belt immediately below each ink head in an abbreviated manner, and thereby to avoid an increase in memory capacity and a delay in processing.

Further, in the present embodiment, the roller profile data is extracted based on a frequency corresponding to the rotation period of the driven roller 162, and an eccentricity component of the driven roller 162 is removed from a frequency corresponding to the travel speed of the transfer belt to extract the belt profile data. Accordingly, the roller profile data and the belt profile data can be obtained from one measurement result without an increase in the amount of measurement of the travel speed at the measurement points. Thus, the burden of profile creation can be reduced.

Moreover, in the present embodiment, the travel speed at the first measurement point is the travel speed of the transfer belt surface, and the second measurement point is the rotational speed of the support roller. Further, a speed measurer for the first measurement point is the laser Doppler velocimeter 315 provided attachably and detachably to the printing machine. Accordingly, the laser Doppler velocimeter 315 can be connected to the printing machine 100 only at the time of belt profile creation and removed therefrom after the profile creation. This eliminates the necessity of implementing an expensive velocimeter in the printing machine and makes it possible to reduce the fabrication cost of the printing machine.

EXPLANATION OF REFERENCE NUMERALS

| | |
|---|---|
| CR | COMMON ROUTE |
| DR | DISCHARGING ROUTE |
| FR | FEEDING ROUTE |
| R | REGISTRATION PART |
| SR | SWITCHBACK ROUTE |
| 10 | RECORD MEDIUM |
| 100 | PRINTING MACHINE |
| 110 | HEAD UNIT |
| 120 | SIDE PAPER SUPPLY TABLE |
| 130 | PAPER FEED TRAY |
| 140 | DISCHARGE PORT |
| 150 | PAPER RECEIVING TRAY |
| 160 | TRANSFER BELT |
| 161 | DRIVE ROLLER |
| 162 | DRIVEN ROLLER |
| 170, 172 | SWITCHING MECHANISM |
| 183 | PAPER FEED DRIVE UNIT |
| 200 | OPERATION PANEL |
| 220 | SIDE PAPER FEED DRIVE UNIT |
| 230a, 230b | TRAY DRIVE UNIT |
| 240 | REGISTRATION DRIVE UNIT |
| 250 | BELT DRIVE UNIT |
| 260 | FIRST UPPER SURFACE TRANSFER DRIVE UNIT |
| 265 | SECOND UPPER SURFACE TRANSFER DRIVE UNIT |
| 270 | UPPER SURFACE DISCHARGING DRIVE UNIT |
| 281 | SWITCHBACK DRIVE UNIT |
| 282 | PAPER REFEED DRIVE UNIT |
| 300 | CONTROL UNIT |
| 311 | DRIVE-SIDE ENCODER |
| 312 | DRIVEN-SIDE ENCODER |
| 313 | BELT HP SENSOR |
| 314 | ROLLER HP SENSOR |
| 315 | LASER DOPPLER VELOCIMETER |
| 320 | PROFILE GENERATOR |
| 320a | MONITOR SECTION |
| 320b | TEMPERATURE SENSOR |
| 321 | DSP |
| 322 | CPU |
| 322a | DATA PROCESSOR |
| 323 | ENCODER DATA MEMORY |

-continued

| | |
|---|---|
| 330 | EJECTION CONTROLLER |
| 331 | FPGA |
| 332 | PROFILE DATA MEMORY |
| 333 | PROFILE CORRECTOR |
| 334 | HEAD CONTROLLER |
| 400 | PROFILE GENERATING DEVICE |
| 400a | LDV DEVICE |
| 400b | PC |
| 401 | SPEED RATIO COMPUTING SECTION |
| 401a | ROLLER SPEED EXTRACTOR |
| 401b | BELT SPEED EXTRACTOR |
| 402 | DATA PROCESSOR |
| 403 | DATA MEMORY |
| 404 | COMMUNICATION INTERFACE |
| 1331 | CORRECTION CONTROLLER |
| 1331a | ROLLER PROFILE CORRECTION CONTROL SECTION |
| 1331b | BELT PROFILE CORRECTION CONTROL SECTION |
| 1332 | STORAGE |
| 1332a, 1332b | STORAGE MEMORY |
| 1333 | EJECTION CONTROLLER |
| 1334 | DRIVE CONTROLLER |
| 1335 | SYSTEM CONTROLLER |

The invention claimed is:

1. A printing machine comprising:

a transfer belt of an endless form applied over support rollers, driving means for rotating the support rollers to move the transfer belt in an endless manner, and ink heads for forming images to overlap on a record sheet on the transfer belt, the printing machine further comprising:

speed measuring means for measuring travel speeds at a pair of measurement points set on a combination of the transfer belt and the support rollers;

an extractor for working with a temporal variation in ratios of speeds between the measurement points measured by the speed measuring means to extract a set of speed ratio data having frequencies corresponding to the ratios of the speeds;

a storage for storing the set of speed ratio data as extracted;

print control means for working with the set of speed ratio data stored in the storage to control timings of formation of images by the ink heads for reduction in positional deviation among the images on the transfer belt; and the ink heads for working with the print control means to form images on a record medium.

2. The printing machine according to claim 1, wherein the speed measuring means is a core member speed measuring means for measuring travel speeds at a pair of measurement points of a core portion formed by core members connected in a continuous loop form in a circumferential direction of the transfer belt inside the transfer belt, and the extractor works with a temporal variation in ratios of speeds between the measurement points measured by the core member speed measuring means to extract a set of ratio data having frequencies corresponding to the ratios of the speeds of the core portion.

3. The printing machine according to claim 2, wherein the pair of measurement points for measurement of travel speeds are positions of intersection points of the core portion with respective normal lines to a first roller and a second roller at respective contact points thereof with an inner circumferential surface of the transfer belt, the first roller and the second roller being respectively disposed at front and back ends of a surface of the transfer belt facing the ink heads, and the core member speed measuring means measures components in tangent directions at the contact points as travel speeds of the core member at the respective positions of the intersection points.

4. The printing machine according to claim 3, wherein the core member speed measuring means includes a detecting means for detecting angular speeds of the first roller and the second roller as travel speeds of the core member at the respective positions of the intersection points, and the extractor works with the temporal variation in ratios of the angular speeds detected by the detecting means to extract the set of speed ratio data.

5. The printing machine according to claim 3, wherein the first roller is a drive roller, and the second roller is a driven roller for rotating in response to driving force of the drive roller transmitted through the transfer belt.

6. The printing machine according to claim 1, wherein the extractor sets a point on the transfer belt as a reference point, sets a distance between the pair of the measurement points as a reference relative distance, sets a ratio of speeds between one measurement point of the pair of the measurement points and the other measurement point as a relative ratio of speeds, sets a speed at a time when the reference point is positioned at any one of the pair of the measurement points as a reference speed, and thereafter, sequentially accumulates the relative ratio of speeds between the pair of the measurement points on the reference speed starting from the reference point in a circumferential direction of the belt at intervals of the reference relative distance to calculate a ratio of speeds at each point to the reference point over an entire loop of the belt.

7. The printing machine according to claim 1, further comprising a monitor for monitoring of a length of the transfer belt, and wherein the extractor performs extraction of the set of speed data upon detection of a change in the length of the transfer belt.

8. The printing machine according to claim 1, further comprising a monitor for monitoring a change in an ambient temperature around the transfer belt, and wherein the extractor performs extraction of the set of speed data upon detection of a change in the ambient temperature around the transfer belt.

9. The printing machine according to claim 1, wherein the extractor comprises a belt speed extractor works with a temporal variation in travel speeds at the respective measurement points measured by the speed measuring means to extract a set of belt profile data having frequencies corresponding to a travel speed of the transfer belt; and a roller speed extractor works with the temporal variation in the travel speeds at the respective measurement points measured by the speed measuring means to extract a set of roller profile data having frequencies corresponding to a rotational speed of a support roller, the belt speed extractor and the roller speed extractor calculate a temporal variation in ratios of speeds between the measurement points as the temporal variation in the travel speeds at the respective measurement points, and works with frequencies corresponding to the ratios of the speeds as calculated to extract the set of belt profile data and the set of roller profile data, the storage stores the set of belt profile data and the set of roller profile data as extracted, upon performance of print processing, the print control means measures a travel speed at any one of the pair of the measurement points, corrects a result of the measurement on a basis of the set of belt profile data and the set of roller profile data, and controls timings of formation of images by the ink heads for reduction in positional deviation among the images on the transfer belt, and the ink heads works with the print control means to form images on a record medium.

10. The printing machine according to claim 9, wherein the roller speed extractor works with the temporal variation in the travel speeds at the respective measurement points to extract the set of roller profile data on a basis of frequencies corresponding to a rotation period of the support roller, and the belt speed extractor calculates the frequencies corresponding to the rotation period of the support roller as an eccentricity component of the support roller, and removes the eccentricity component of the support roller from the frequencies corresponding to the travel speeds of the transfer belt to extract the set of belt profile data.

11. The printing machine according to claim 9, wherein the pair of the measurement points comprises a first measurement point and a second measurement point, wherein a travel speed at the first measurement point is a travel speed of a surface of the transfer belt, and a travel speed at the second measurement point is a rotational speed of the support roller, and the speed measuring means for the first measurement point is a noncontact measuring device attachably and detachably provided to the printing machine and configured to optically measure the travel speed of the surface of the transfer belt.

12. The printing machine according to claim 1, wherein the pair of the measurement points comprises a first measurement point and a second measurement point, wherein a travel speed at the first measurement point is a travel speed of a surface of the transfer belt, and a travel speed at the second measurement point is a rotational speed of the support roller, the extractor comprises a belt speed extractor for working with a temporal variation in travel speeds at the respective measurement points measured by the speed measuring means to extract a set of belt profile data having frequencies corresponding to a travel speed of the transfer belt, and a roller speed extractor for working with the temporal variation in the travel speeds at the respective measurement points measured by the speed measuring means to extract a set of roller profile data having frequencies corresponding to a rotational speed of the support roller, the belt speed extractor and the roller speed extractor set a travel speed at the first measurement point at an arbitrary time as a reference speed for the temporal variation in the travel speeds at the respective measurement points, set a ratio of speeds at the first measurement point after elapse of a prescribed time as a relative speed ratio, sequentially accumulate the relative ratio of speeds on the reference speed to calculate a set of cumulative data on a ratio of speeds at each point to the reference speed over an entire loop of the belt, and work with frequencies corresponding to the set of cumulative data to extract the set of belt profile data and the set of roller profile data, the storage stores the set of belt profile data and the set of roller profile data as extracted, upon performance of print processing, the print control means measures a travel speed at any one of the pair of the measurement points, corrects a result of the measurement on a basis of the set of belt profile data and the set of roller profile data, and controls timings of formation of images by the ink heads for reduction in positional deviation among the images on the transfer belt, and the ink heads works with the print control means to form images on a record medium.

13. A method for controlling ejection of ink heads in a printing machine, the printing machine comprising:

a transfer belt of an endless form applied over support rollers;

driving means for rotating the support rollers to move the transfer belt in an endless manner; and ink heads for forming images to overlap on a record medium on the transfer belt, the method being further comprising:

a speed measuring step of measuring travel speeds at a pair of measurement points set on a combination of the transfer belt and the support rollers;

a speed extracting step of working with a temporal variation in the travel speeds at the respective measurement points measured in the speed measuring step to extract a set of speed ratio data having frequencies corresponding to the ratios of speeds; and a print control step of, upon performance of print processing, measuring a travel speed at any one of the pair of the measurement points, correcting a result of the measurement on a basis of the set of speed ratio data, and controlling timings of formation of images by the ink heads for reduction in positional deviation among the images on the transfer belt.

14. The method for controlling ejection in the printing machine according to claim 13, characterized by the speed measuring step comprising measuring travel speeds at a pair of measurement points of a core portion formed by core members connected in a continuous loop form in a circumferential direction of the transfer belt inside the transfer belt, and the speed extracting step comprising:

working with a temporal variation in ratios of speeds between the measurement points measured in the speed measuring step to extract a set of speed ratio data having frequencies corresponding to the ratios of the speeds of the core portion.

15. The method for controlling ejection in the printing machine according to claim 13, the speed extraction step comprising;

setting a point on the transfer belt as a reference point, setting a distance between the pair of the measurement points as a reference relative distance, setting a ratio of speeds between one measurement point of the pair of the measurement points and the other measurement point as a relative ratio of speeds, setting a speed at a time when the reference point is positioned at any one of the pair of the measurement points as a reference speed, and, thereafter, subsequently accumulating the relative ratio of speeds between the pair of the measurement points on the reference speed starting from the reference point in a circumferential direction of the belt at intervals of the reference relative distance to calculate a ratio of speeds at each point to the reference point over an entire loop of the belt.

16. The method for controlling ejection in the printing machine according to claim 13, the speed extracting step comprising:

working with a temporal variation in travel speeds at the respective measurement points measured in the speed measuring step to extract a set of belt profile data having frequencies corresponding to a travel speed of the transfer belt, and working with the temporal variation in the travel speeds at the respective measurement points to extract a set of roller profile data having frequencies corresponding to a rotational speed of a support roller, and the print control step comprising, upon performance of print processing, measuring a travel speed at any one of the pair of the measurement points, correcting a result of the measurement on a basis of the set of belt profile data and the set of roller profile data, and controlling timings of formation of images by the ink heads for reduction in positional deviation among the images on the transfer belt.

* * * * *